(12) United States Patent
Kojima

(10) Patent No.: US 7,397,595 B2
(45) Date of Patent: Jul. 8, 2008

(54) ELECTROCHROMIC DEVICE

(75) Inventor: Kyoko Kojima, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 247 days.

(21) Appl. No.: 11/209,843

(22) Filed: Aug. 24, 2005

(65) Prior Publication Data

US 2006/0262377 A1 Nov. 23, 2006

(30) Foreign Application Priority Data

May 19, 2005 (JP) ............................. 2005-146957

(51) Int. Cl.
*G02F 1/153* (2006.01)
(52) U.S. Cl. .................. 359/271; 359/274; 359/270
(58) Field of Classification Search ......... 359/265–275; 348/775, 817
See application file for complete search history.

(56) References Cited

U.S. PATENT DOCUMENTS

| | | | | |
|---|---|---|---|---|
| 5,136,419 A * | 8/1992 | Shabrang | ............. | 359/265 |
| 6,639,708 B2 | 10/2003 | Elkadi et al. | | |
| 2003/0218941 A1 | 11/2003 | Terao et al. | | |
| 2003/0227664 A1 * | 12/2003 | Agrawal et al. | ............ | 359/269 |
| 2005/0068603 A1 * | 3/2005 | Berggren et al. | ............ | 359/265 |
| 2005/0084660 A1 | 4/2005 | Kojima et al. | | |
| 2005/0111071 A1 | 5/2005 | Kojima et al. | | |

FOREIGN PATENT DOCUMENTS

| | | |
|---|---|---|
| JP | 2002-82360 | 3/2002 |
| JP | 2002-287173 | 10/2002 |
| JP | 2003-50406 | 2/2003 |
| JP | 2004-273055 | 9/2004 |

OTHER PUBLICATIONS

Kyoko Kojima, "In-Plane Switching Electrochromic Device Using Conductive Polymers", Polymer Preprints 2005, 46(1), pp. 523-524.
Shawn A. Sapp et al., "High Contrast Ratio and Fast-Switching Dual Polymer Electrochromic Devices", 1998 American Chemical Society, Chem. Mater. 1998, 10—pp. 2101-2108.

* cited by examiner

Primary Examiner—Evelyn A. Lester
(74) Attorney, Agent, or Firm—Antonelli, Terry, Stout & Kraus, LLP.

(57) ABSTRACT

This invention provides an electrochromic device which has superior coloration repeat properties, high light transmittance and small thickness. A film is provided comprising a first electrode and second electrode in the same plane, and an electrochromic region and electrolyte region laminated in this plane. The electrochromic region is provided on the second electrode, the electrolyte region is provided on the first electrode, and the boundary between the electrochromic region and electrolyte region lies in the planar direction of the film.

12 Claims, 19 Drawing Sheets

ELECTROCHROMIC DEVICE

CLAIM OF PRIORITY

The present application claims priority from Japanese application JP-A No. 146957/2005 filed on May 19, 2005, the content of which is hereby incorporated by reference into this application.

CROSS REFERENCE TO RELATED APPLICATION

U.S. patent application Ser. Nos. 10/998,653, 10/928,284 and 11/147,271 are co-pending applications of this application. The content of which are incorporated herein by cross-reference.

FIELD OF THE INVENTION

This invention relates to an electrochromic device which operates using the principle of electrochromism.

BACKGROUND OF THE INVENTION

"Electrochromism", a phenomenon wherein the color of a compound changes reversibly with the application of a voltage, has been applied to modulated light window and display devices. In a prior art electrochromic device, an electrochromic layer and electrolyte layer are sandwiched between a pair of electrodes in which at least one is a transparent electrode, and electrochromism is manifested by applying a voltage between these electrodes. This structure is described in JP-A No. 287173/2002.

In JP-A No. 50406/2003, an electrochromic glass plate is described wherein an electrochromic layer, an electrolyte film and an ion storage layer are sandwiched between a pair of transparent conductor (electrode) layers. In this invention, indium-tin oxide (ITO) and fluorine-doped tin oxide (FTO) are used as the transparent electrodes or transparent conductors. A display device using the principle of electrochromism is described in JP-A No. 82360/2002.

The prior art electrochromic device wherein an electrochromic layer and electrolyte layer are sandwiched between a pair of transparent electrodes is well-known. The Inventor has reported an in-plane switching electrochromic device wherein an electrochromic layer and an electrolyte layer are laminated on a substrate carrying two electrodes, as described in Polymer Preprints 2005, 46 (1), 523. Two kinds of in-plane switching electrochromic devices with different lamination sequences which can both perform repeat operation are known. In Chemistry of Materials 1998, 10, p. 2101, the structure shown in FIG. 31, wherein electrochromic layers 1011, 1017 are formed on both sides of an electrolyte layer 1012, and sandwiched between a pair of electrodes 1013, 1014 connected to a power supply 1015 as shown in FIG. 31, is reported.

[Patent document 1] JP-A No. 287173/2002

[Patent document 2] JP-A No. 50406/2003

[Patent document 3] JP-A No. 82360/2002

[Nonpatent document 1] Polymer Preprints 2005, 46(1), 523

[Nonpatent document 2] Chemistry of Materials 1998, 10, p. 2101

SUMMARY OF THE INVENTION

Two in-plane switching electrochromic devices with different lamination sequences are described in Polymer Preprints 2005, 46 (1), 523. However, in Type A wherein an electrochromic layer is provided in contact with a substrate having plural electrodes, and an electrolyte layer is formed on the electrochromic layer, since there were many electric current components which penetrate only the electrochromic layer which has a relatively low resistance, the power consumption was high. On the other hand, in Type B wherein an electrolyte layer is formed in contact with a substrate having plural electrodes, and an electrochromic layer is formed on the electrolyte layer, when a voltage was applied, electric potential contours leave the anode and pass through the electrolyte layer where the resistance is relatively high, therefore if the applied voltage was low, the electrochromic layer did not become colored, and a high voltage was required to obtain coloration.

Also, with any of these in-plane switching electrochromic devices, since the potential slope of the electric field which generates the coloring when a voltage is applied, arises from the interface which advances towards the electrochromic layer from the electrolyte layer, coloration does not occur easily at the electrochromic layer which is far from the interface in a perpendicular direction, and the coloring density corresponding to the thickness of the electrochromic layer is not obtained.

Although the electrochromic device having the structure shown in FIG. 31 has the advantage that, since oxidation and reduction take place simultaneously at two electrochromic layers which are respectively in contact with a pair of electrodes, the electrochromic reaction rate and efficiency are high, and a high coloring contrast is obtained. On the other hand, the light transmittance of the device decreased overall.

As a result of intensive studies aimed at resolving these problems in the aforesaid in-plane switching electrochromic devices, a novel structure for an in-plane switching electrochromic device was invented.

Specifically, an electrochromic device according to the present invention may comprise an insulating substrate, first and second electrodes installed on the substrate at a given distance apart, an electrochromic layer, and an electrolyte layer. The electrochromic layer is installed on the substrate not in contact with the first electrode but in contact with the second electrode. The electrolyte layer is installed on the substrate in contact with the first electrode. The boundary is between the electrochromic layers. The electrolyte layer lies on the substrate.

Alternatively, the electrochromic device according to the present invention may comprise an insulating substrate, first and second electrodes installed on the substrate at a given distance apart, a conductive layer installed on the first electrode, an electrochromic layer installed on the substrate not in contact with the first electrode and conductive layer but in contact with the second electrode, and an electrolyte layer installed on the substrate in contact with the conductive layer and the electrochromic layer. The boundary between the electrochromic layer and electrolyte layer lies on the substrate. The conductive layer is preferably an electrochromic material.

According to the invention, an electrochromic device and electrochromic apparatus of simple structure and small thickness can be obtained. An information recording medium having superior repeat coloration properties and high light transmittance, and a recording/reproducing method and a recording/reproducing device using this medium, are thereby obtained.

DETAILED DESCRIPTION OF THE PREFERRED EMBODIMENTS

Figure 1:
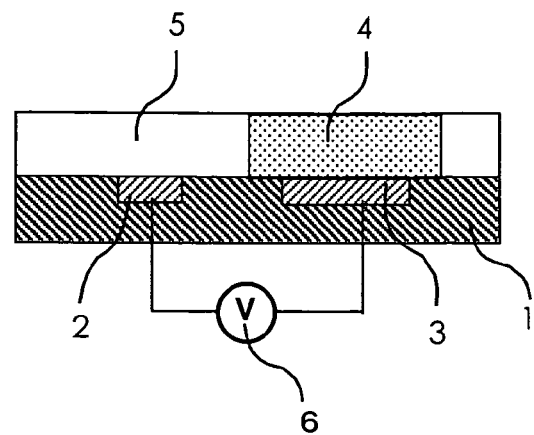
FIG. 1 is a cross-sectional view of an electrochromic device according to the invention.

Hereafter, some embodiments of the invention will be described referring to the drawings.

FIG. 1 is a cross-sectional view showing a typical structure of an electrochromic device according to the invention. 1 is an insulating substrate, 2 is a first electrode, 3 is a second electrode, 4 is an electrochromic layer, 5 is an electrolyte layer and 6 is a power supply. The first electrode 2 and second electrode 3 are electrically separate from each other. Although the electrochromic layer 4 is formed in contact with the second electrode 3, it is not in contact with the first electrode 2. The electrochromic layer 4 also has electrical contact with the electrolyte layer 5, the electrolyte layer 5 being in contact with the first electrode 2. To operate the device, the power supply 6 is connected between the first electrode 2 and the second electrode 3.

Figure 2:
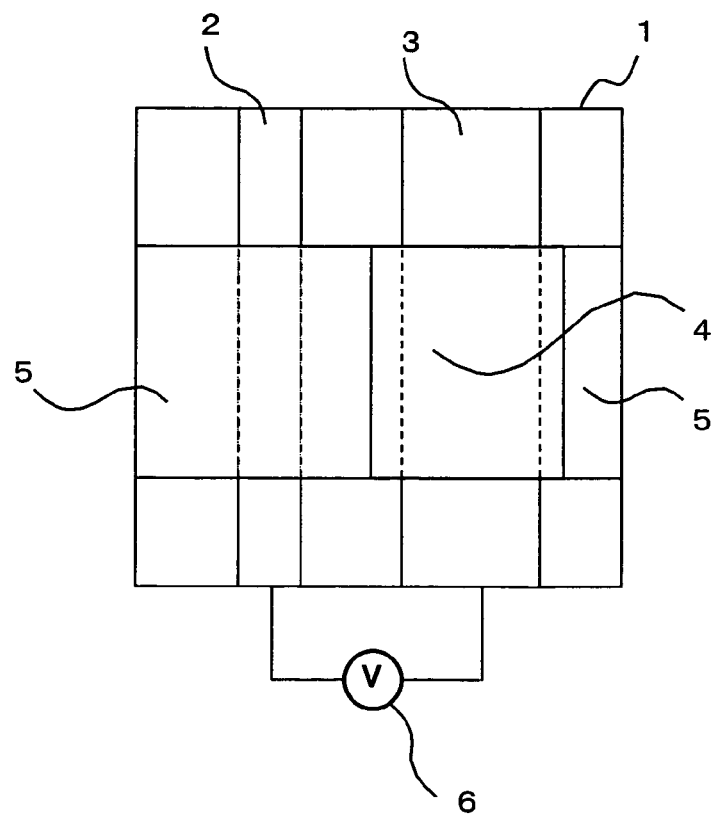
FIG. 2 is an aerial view of the electrochromic device according to the invention.

FIG. 2 is a plan view of the electrochromic device according to the invention which was shown in cross-sectional view in FIG. 1. The insulating substrate 1 comprises the first electrode 2 and second electrode 3 that were electrically separate on the same surface. It also comprises the electrolyte layer 5 in contact with the first electrode 2, and the electrochromic layer 4 in contact with the second electrode 3, respectively on the surface carrying the two electrodes.

Figure 3:
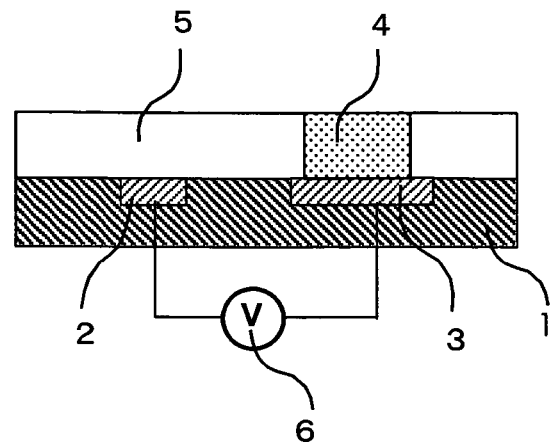
FIG. 3 is a cross-sectional view of the electrochromic device according to the invention.

The feature of the in-plane switching electrochromic device of this invention is that the electrochromic layer 4 is not present in the plural electrodes 2, 3 disposed on the same insulating substrate 1. In other words, in the in-plane switching device which is operated using a pair of electrodes, the electrochromic layer can be in contact with only one electrode. On the other hand, the electrolyte layer can be in contact with both electrodes. FIG. 3 shows a cross-sectional view of one example. As shown in FIG. 3, the electrochromic layer 4 is in contact with only the second electrode 3, whereas the electrolyte layer 5 can be in contact right through to the first electrode 2 and second electrode 3.

Figure 30:
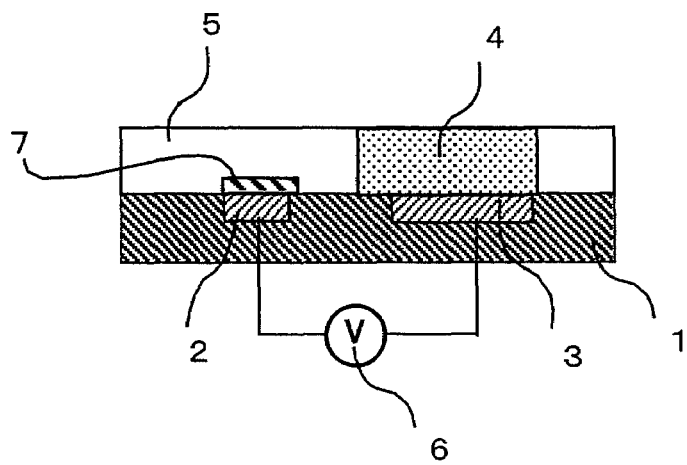
FIG. 30 is a cross-sectional view of an electrochromic device according to the invention.
Figure 31:
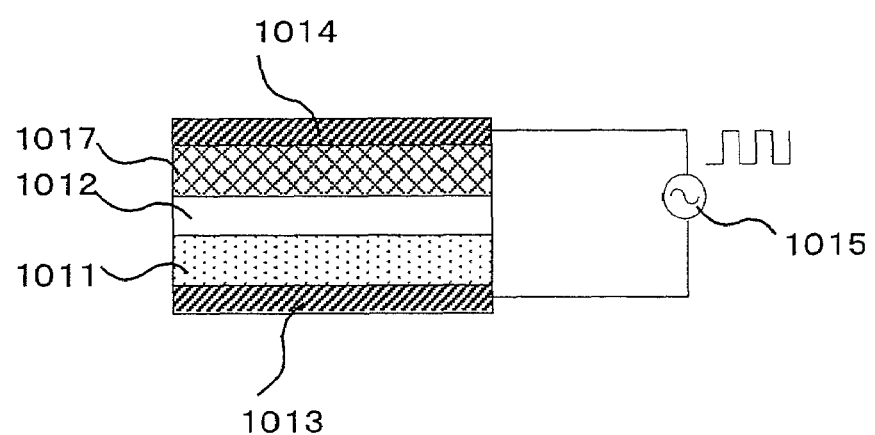
FIG. 31 is a cross-sectional view of an electrochromic device according to the prior art.

FIG. 30 is a cross-sectional schematic diagram showing another example of the electrochromic device according to the invention. In the electrochromic device of this example, the first electrode 2 and second electrode 3 that were separated electrically are disposed on the insulating substrate 1, a conductive layer 7 is disposed on the first electrode 2, the electrochromic layer 4 is disposed on the second electrode 3, the conductive layer 7 and the electrochromic layer 4 are not in mutual contact, and the electrolyte layer 5 is formed therebetween. When this device is used as a display, the electrode on which the electrochromic layer 4 was formed is the electrode used for the display. The material used for the conductive layer 7 is the same material as that used for the electrochromic layer. In an electrochromic device of this construction, when a voltage is applied between the two electrodes 2, 3, an oxidation reaction and a reduction reaction which are electrochemically complementary occur simultaneously at the two electrodes respectively, so the coloring rate of the electrochromic layer 4 increases, and since the coloring efficiency is high, the coloring contrast is also high. Usually, since the conductive layer absorbs in the visible light region, the light transmittance of the whole device falls in the structure of the prior art shown in FIG. 31, but decrease of light transmittance does not occur in the structure shown in FIG. 30.

In FIG. 30, an example was shown where the electrochromic layer 4 covers the second electrode 3 completely, but as shown in FIG. 3, the electrochromic layer 4 may be formed to cover the second electrode 3 partially, and the boundary of the electrochromic layer 4 and the electrolyte layer 5 may also be situated on the second electrode 3.

Next, the operating principle of the in-plane switching electrochromic device of the invention will be described. Here, as an example, a device will be described which comprises a glass substrate, ITO as a transparent electrode, PEDOT/PSS which is a known electrochromic material, and poly (propylene carbonate) (PPC)/Lithium Triflate (LiOTf) as a lithium salt-containing solid polymer electrolyte. PEDOT/PSS is an electrochromic material of polythiophene type, and in the steady state when a voltage is not applied, it is effectively colorless since it exists as a quinoid wherein the thiophene is oxidized. However, when a voltage is applied and it is doped with lithium ions, the thiophene structural sites are reduced and it assumes a neutral aromatic structure, so it turns a deep blue color.

Figure 4:
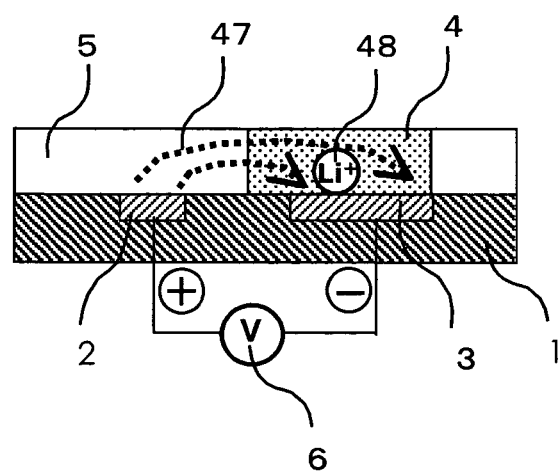
FIG. 4 is a cross-sectional view of the electrochromic device according to the invention.

FIG. 4 is a diagram showing the coloring principle of the electrochromic layer 4 when a voltage is applied so that the first electrode 2 is at a positive potential with respect to the second electrode 3. As shown in FIG. 4, if a voltage is applied between the two electrodes 2, 3, an electric field 47 will be generated from the higher potential to the lower potential. Hence, in accordance with the potential slope of the electric field 47, lithium ions 48 will move in the direction of relatively low electric potential, so the lithium ions 48 which were originally present in the electrolyte layer 5 invade the electrochromic layer 4. Although not shown in the figure, electrons (or triflate ions which are negative ions) move in the reverse direction to the lithium ions 48. Since PEDOT which was originally in an oxidation state is thereby reduced, it changes to a neutral state and the electrochromic layer 4 becomes colored. If a reverse voltage is applied which makes the first electrode 2 negative, the colored device will be promptly decolorized. Alternatively, if the potential between the two electrodes 2, 3 is made equal or the circuit is broken and opened, although the response is slow, it will again be decolorized. Due to the above methods, provided that an excessive voltage is not applied which would cause the material to decompose, coloration/decoloration can be repeated without deterioration.

The features of the in-plane switching electrochromic device of the invention, in comparison with the in-plane switching electrochromic device known in the art, are as follows. For example, if the electrical resistance of the electrochromic layer comprising the electrochromic material PEDOT/PSS is compared with the electrical resistance of the electrolyte layer comprising PPC/LiOTf, the resistance of the electrolyte layer is higher than the resistance of the electrochromic layer by three orders of magnitude.

Figure 5:
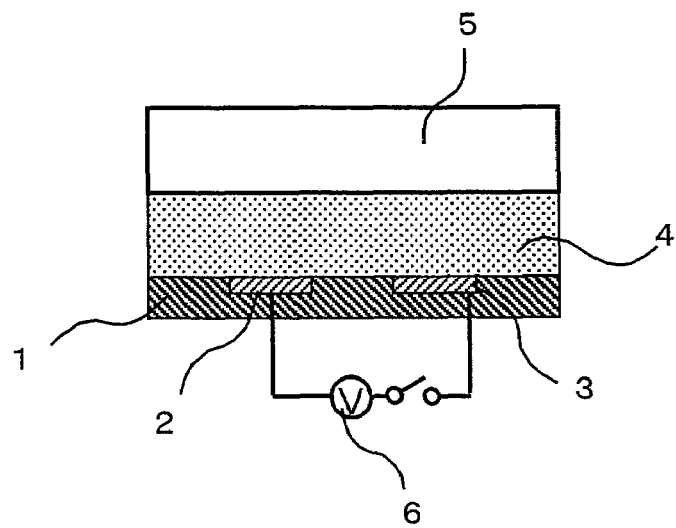
FIG. 5 is a cross-sectional view of an in-plane switching electrochromic device known in the art.
Figure 6:
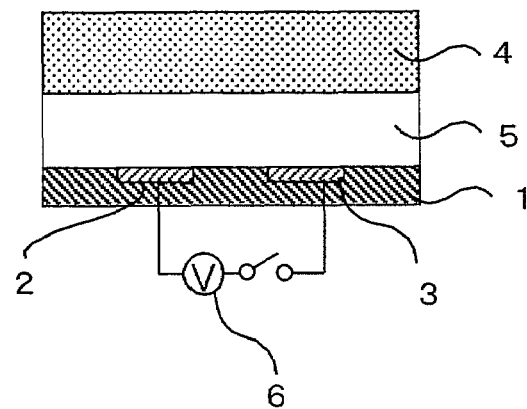
FIG. 6 is a cross-sectional view of an in-plane switching electrochromic device known in the art.

Therefore, as shown in FIG. 5, in the electrochromic device known in the art having a structure wherein the electrolyte layer 5 was laminated on the electrochromic layer 4, since the electrochromic layer 4 with low resistance is in contact with the first electrode 2 and second electrode 3, a large "leak current" flowed that could not contribute to coloration, the coloration efficiency was poor and power consumption was also high. Further, as shown in FIG. 6, in the electrochromic device known in the art having a structure wherein the electrochromic layer 4 was laminated on the electrolyte layer 5, since the electric field generated when a voltage is applied between the two electrodes 2, 3 advances from the electrolyte layer 5 towards the electrochromic layer 4, it was easy to color the part near the boundary of the electrochromic layer 4 with the electrolyte layer 5, but in the far part the electric field becomes weaker, so the ion doping amount was small, and the coloration density was low.

In the electrochromic device of the invention, since the electrochromic layer is not in contact with the two electrodes simultaneously, the leak current which flows steadily becomes small due to the relatively large resistance of the electrolyte layer. Also, as shown in FIG. 4, although the potential slope of the electric field generated between the two electrodes passes through the boundary of the electrolyte layer 5 and the electrochromic layer 4 which contributes directly to coloration, almost all of it can be colored simultaneously in the thickness direction of the electrochromic layer 4, so the coloration density is high which is an advantage. Further, coloration takes place due to the invasion of the electrochromic layer 4 by lithium ions, and since the resistance of the electrochromic layer 4 is relatively low, electrons which participate directly in the reduction of PEDOT diffuse easily in a horizontal direction to the substrate, so coloration takes place in a horizontal direction almost uniformly.

Another advantage of the in-plane switching device of the invention, in comparison with the in-plane switching electrochromic device of the prior art, is that in the prior art, at least two layers, i.e., the electrochromic layer and electrolyte layer, needed to be laminated on the substrate carrying the electrodes, but according to the present invention, only one layer is required, so the number of layers can be reduced, and the thickness of the whole device can be reduced.

Examples of materials used for the in-plane switching electrochromic device of the invention are shown below.

For the insulating substrate, glass, quartz or a plastic material such as polycarbonate, polyethylene terephthalate (PET), acrylic resin, polystyrene, polyethylene or polypropylene, is used. If a plastic material which has flexibility is used for the substrate, a flexible in-plane switching electrochromic device can be manufactured. Also, since polylactic acid and cellulose fiber can be extracted from plants and have biodegradability, waste disposal is less of a problem.

For the first electrode and second electrode, a metal oxide such as ITO, indium oxide ($In_2O_3$), fluorine-doped indium oxide (FTO), tin oxide ($SnO_2$), and IZO (indium zinc oxide), aluminum, gold, silver, copper, palladium, chromium, platinum or rhodium, are used. Among these, metal oxide compounds like ITO have a high light transmittance, so if a transparent insulating substrate is used, they can give transparency to the whole device. Metals such as aluminum, gold and chromium have a high visible light reflectance, so they permit a reflection type electrochromic device to be manufactured. It is also possible to use conductive carbon nanotube (CNT) as a transparent electrode material, as described in Science Vol. 305, p. 1273. If plastics or CNT is used for the electrode in the substrate, an electrochromic device consisting entirely of organic materials can be manufactured, toxicity is low compared to the case where heavy metals are used, and it can be burnt when it is thrown away. The first electrode and second electrode are electrically separate from each other at a distance of 1 μm to 1 cm.

For the electrochromic layer, at least one type of material selected from among a conductive polymer electrochromic material, a transition metal oxide electrochromic material and an organic low molecular weight electrochromic material is used. The electrochromic layer is used in a thickness of 10 nm to 10 μm.

Here, the conductive polymer electrochromic material is a polymer which has conductivity like a semiconductor, and is a material whose color (absorption spectrum) changes reversibly when a voltage is applied. The conductive polymer electrochromic material may be polyacethylene, polyaniline, polypyrrole, polythiophene, polyacethylene or polyphenylene vinylene which are conjugated polymers linked by a conjugated double bond or triple bond, a derivative thereof, or a copolymer containing same. The transition metal oxide electrochromic material may be a compound selected from among tungstic oxide, iridium oxide, nickel oxide, titanium oxide or vanadium pentoxide. For example, although tungstic oxide is itself colorless or straw-colored, it turns dark blue reversibly when part of it is reduced.

The electrolyte layer has cations such as lithium ions which are required to make the electrochromic layer change color reversibly when a voltage is applied, and has ion conductivity. In terms of phase state, liquid electrolytes, gel electrolytes and solid electrolytes are known. The electrolyte layer is used in a thickness of 5 nm-50 mm. In the case of a liquid electrolyte and a gel electrolyte, a spacer or wall is provided around the electrolyte layer of the device. Typical electrolyte ingredients are a lithium salt which supplies lithium ions which reversibly enter or leave the electrochromic layer, and an organic solvent or polymer material having ion conductivity which acts as a matrix for dissolving the lithium solts. The electrolyte ion conductivity is preferably $10^{-5}$ S/cm or less in the vicinity of 25° C. The polymer material used as the matrix may be polymethylmethacrylate (PMMA), polyvinyl butyral (PVP), polyethylene oxide (PEO), polypropylene oxide (PPO), polyacrylonitrile (PAN), polyvinylidene fluoride (PVDF), polyethylene carbonate (PEC) or polypropylene carbonate (PPC). These polymers can be used alone, or plural polymers can be used together.

The lithium salt may be lithium tetrafluoroborate ($LiBF_4$), lithium perchlorate ($LiClO_4$), lithium hexafluorophosphate ($LiPF_6$), lithium hexafluoroarsenate ($LiAsF_6$), lithium hexafluoroantimonate ($LiSbF_6$), lithium triflate ($LiCF_3SO_3$) or N-lithiotrifluoromethane sulfonimide ($Li(CF_3SO_2)_2N$). The lithium salt is added in a range of 0.1 to 50% by weight ratio to the polymer material. Salts other than lithium ions can also be used, e.g., a sodium salt or quarternary ammonium salt.

There is also an example wherein a series of ionic liquid compounds and a solidified composition using same, was used as an electrochromic device (Science 2002, Vol. 297, 983), and they may be used also as the in-plane switching electrochromic device of the invention. Specifically, these compounds are the chloride, bromide, iodide, trifluoromethane sulfonate, tetrafluoroborate or hexafluorophosphate of 1-ethyl-3-methylimidazolium, pyridinium salt compounds or aliphatic quarternary ammonium salt compounds. The properties of an ionic liquid are high ion conductivity, large potential window, incombustibility, nonvolatility and high specific heat capacity. An ionic liquid polymer brush structure wherein polyethylene oxide (PEO), a PEO/salt hybrid or an alkyl chain is introduced into the side chain of an ionic liquid compound having a molten salt domain in the polymer side chain, can also make a solid film.

Figure 7:
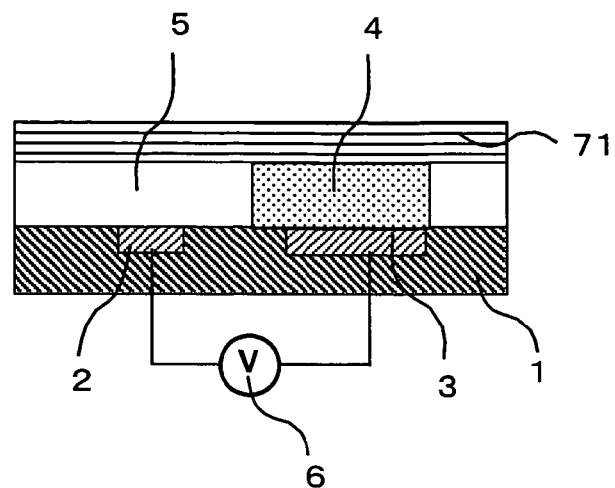
FIG. 7 is a cross-sectional view of an electrochromic device according to the invention.

As shown in FIG. 7, in the electrochromic device of the invention, a protection layer 71 can be formed on the upper surface which can provide effects such as suppressing leak current, preventing damage to the device, preventing entry of oxygen or water molecules which can cause deterioration of the device, and preventing electrostatic surface charge. When used as a display, it is also effective to give an anti-glare coating. To confer plural effects, it is also effective for the protection layer to use plural component ingredients.

Figure 8:
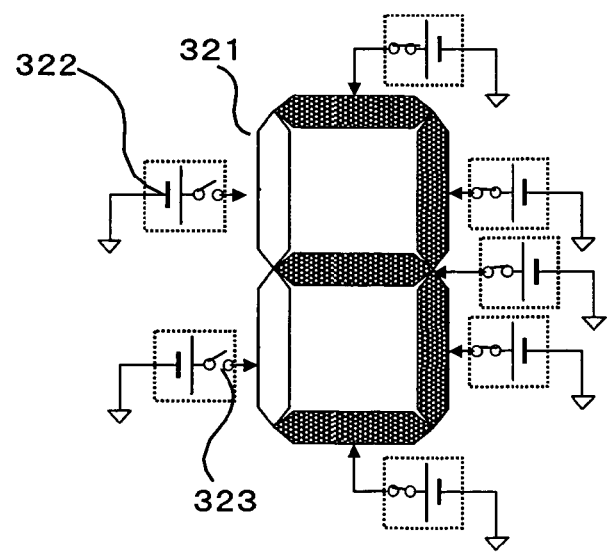
FIG. 8 is a diagram showing an example of a display device using the electrochromic device of the invention.

The device of the invention may be arranged on a matrix and used as a display wherein two-dimensional pixels are arranged to display information. FIG. 8 shows a static drive system which performs independent control for each pixel. A power supply 322 and a switch 323 are wired to pixels 321, respectively, and by opening and closing the switch 323, the voltage applied to the pixels can be controlled so as to change over between "display" and "no display".

The pixels can also be arranged by a matrix drive system wherein the electrodes are wired together and the applied voltage is controlled.

Figure 9:
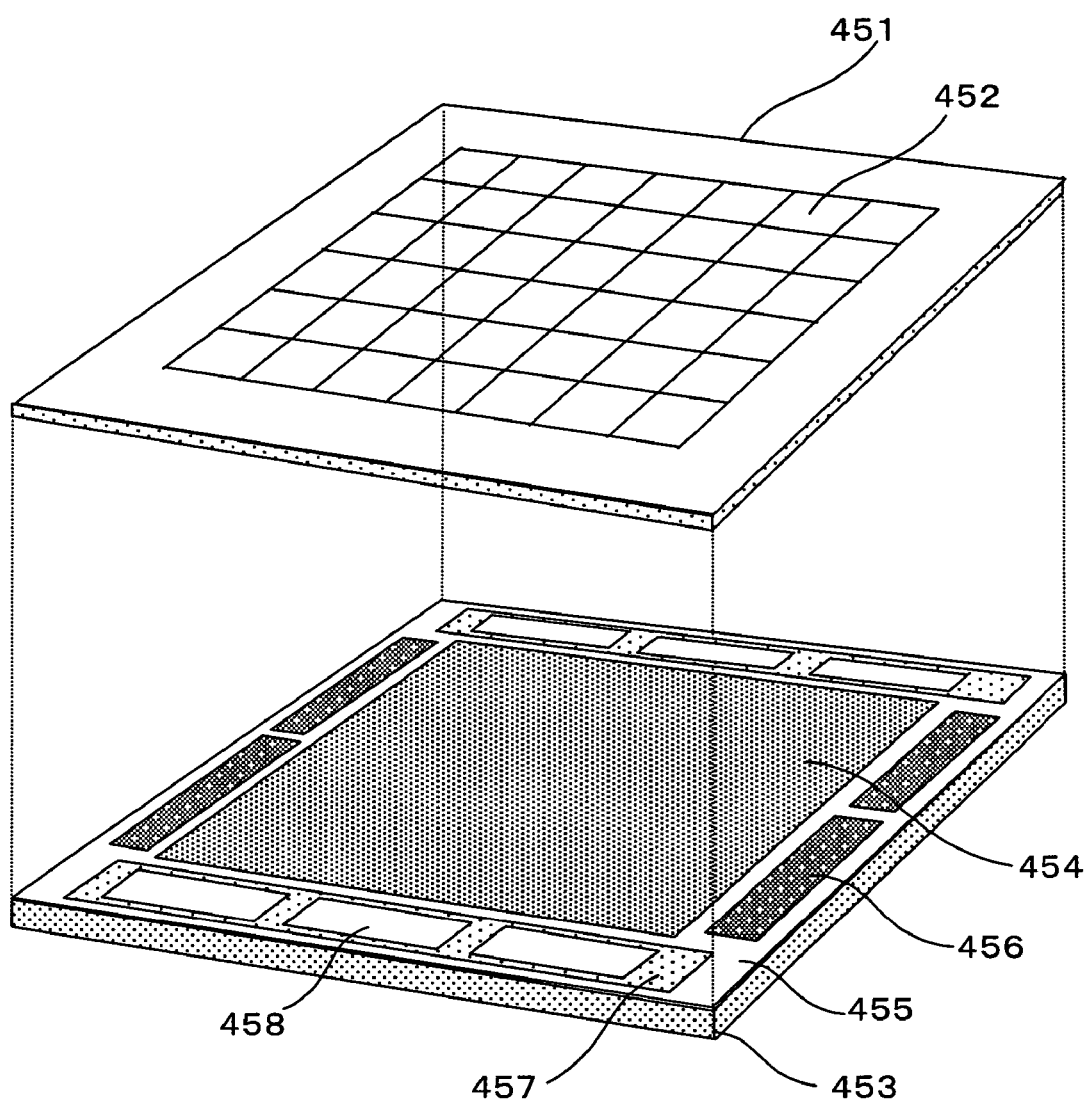
FIG. 9 is a diagram showing an example of a display device using the electrochromic device of the invention.

FIG. 9 is a schematic diagram showing an example of an image information display device using a thin film semiconductor device. A silicon thin film is formed on a substrate 453, an integrated circuit comprising a pixel driver region 454, buffer amplifier 455 and gate driver region 456 is formed thereupon, and the whole is connected to an image information display panel 451 having pixels 452. 457 is a shift register region and 458 is a data driver region.

Figure 10:
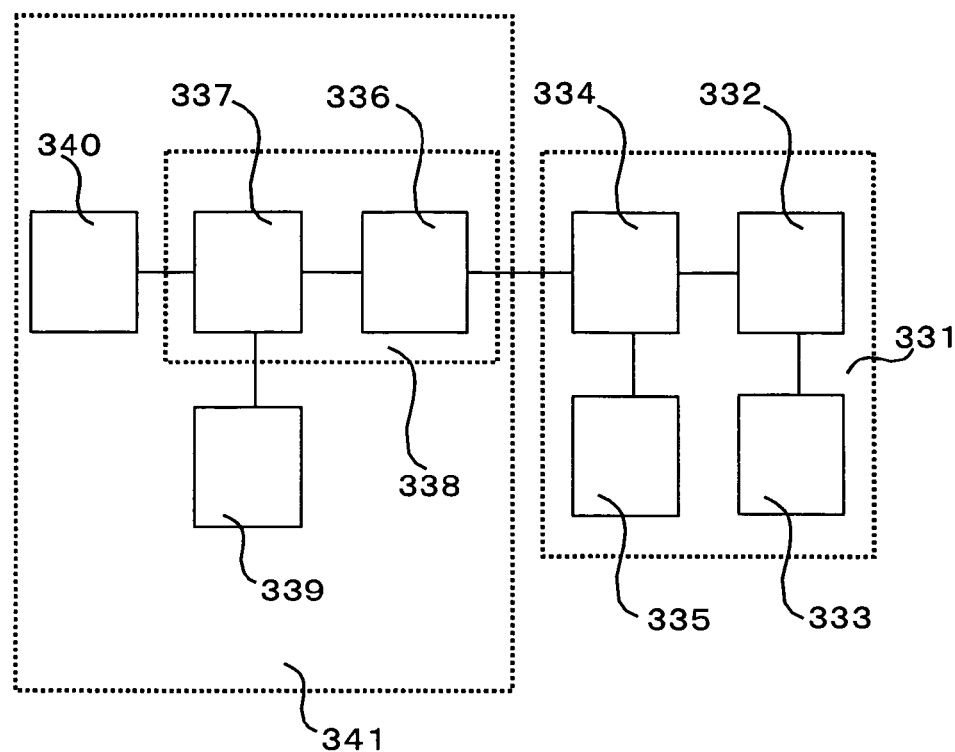
FIG. 10 is a block diagram of a drive circuit of a display device using the electrochromic device of the invention.

FIG. 10 shows a block diagram of a module wherein an electrochromic device array according to this invention such are the display device of FIG. 9, is driven as desired by a computer. A device drive command is issued by a CPU 332 of a control computer 331, and is sent to a display 341 from a display controller 334 to which an image information memory 335 is connected. The command sent to the display 341 drives an electrochromic device array 340 via a driver IC 338 which comprises a timing controller 336, and a driver 337 comprising a pixel driver and a gate driver. 333 is a memory and 339 is a power supply.

If a plastic substrate such as PET is used for the display using the electrochromic device of this invention, it is can be used also for a flexible sheet display or for electronic paper. A transparent background can be used, but a backlight such as a white LED may also be added to the display. If white pigment particles are mixed with the electrolyte, a white electrolyte layer can be formed which makes the display suitable for electronic paper.

The display using an electrochromic device is a non-light emitting type display. Here, it will be compared with other non-light emitting type displays.

First, since it is not necessary to use a polarization plate when the electrochromic device of this invention is used, as compared with liquid crystals, the light utilization efficiency is high and a bright display can be manufactured. Also, in the case of liquid crystals, the viewing angle is narrow and the brightness varies largely with the viewing angle, but in the case of an electrochromic device, there is theoretically no viewing angle dependency. In the case of liquid crystals, rubbing is required to orient the liquid crystal molecules in a certain direction, but in the case of an electrochromic device, there is no need for rubbing. In future, electrochromic devices will offer advantages since plastics can also be used as substrates to make them flexible, and displays can be manufactured by a simple, low-cost printing process. Further, in an electrochromic device, complete solidification is easier than with liquid crystals. The general pixel size of a liquid crystal display is about 0.3 mm. With an electrochromic device, it is possible to form very fine pixels of this order, or still finer.

For electronic paper, a microcapsule type electrophoresis method is known. Black (carbon black) and white (titanium oxide) particles, which are respectively negatively and positively charged, are sealed within microcapsules, and by applying an external electric field so that particles collect at the top or collect at the bottom, the color visible from the top can be changed. The particles are about 40 μm in diameter, the image resolution depending on the particle size. The advantages of the electrochromic device are that, since it is not necessary to manufacture special microcapsules, it is low-cost, it can be manufactured more easily than a microcapsule electrophoresis display by coating or printing on an electrode, and since the thickness between electrodes can be made 1 μm or less, the whole device can also be made thin.

Hereafter, the invention will be described in more detail by specific examples.

EXAMPLE 1

(Construction and Manufacture)

Figure 11:
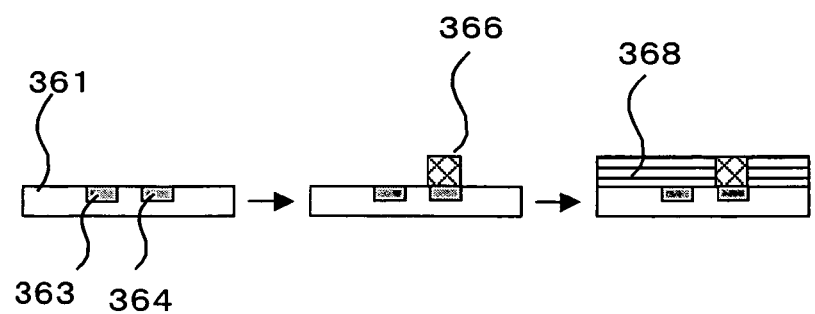
FIG. 11 is a diagram showing a method of manufacturing the electrochromic device according to one example of the invention.

FIG. 11 is a diagram showing a process for manufacturing the electrochromic device of the invention according to a first method.

A 150 nm thick electrochromic layer 366 of a poly(3,4-ethylene dioxythiophene)-polystyrene sulfonic acid complex was formed by a photolithography process on a 3 cm square, 1 mm thick insulating glass substrate 361 carrying an ITO electrode 363 and an ITO electrode 364 of width 5 mm and thickness 50 nm.

A solution of composition 20 wt % polyethylene oxide having a molecular weight of 1 million, 2 wt % lithium perchlorate and 78 wt % tetrahydrofuran was then spin-coated on the remaining exposed part of the substrate at 1000 rpm for 60 seconds to form a 150 nm thick electrolyte layer 368, and an electrochromic device was thus produced.

(Operation of Electrochromic Device)

Figure 12:
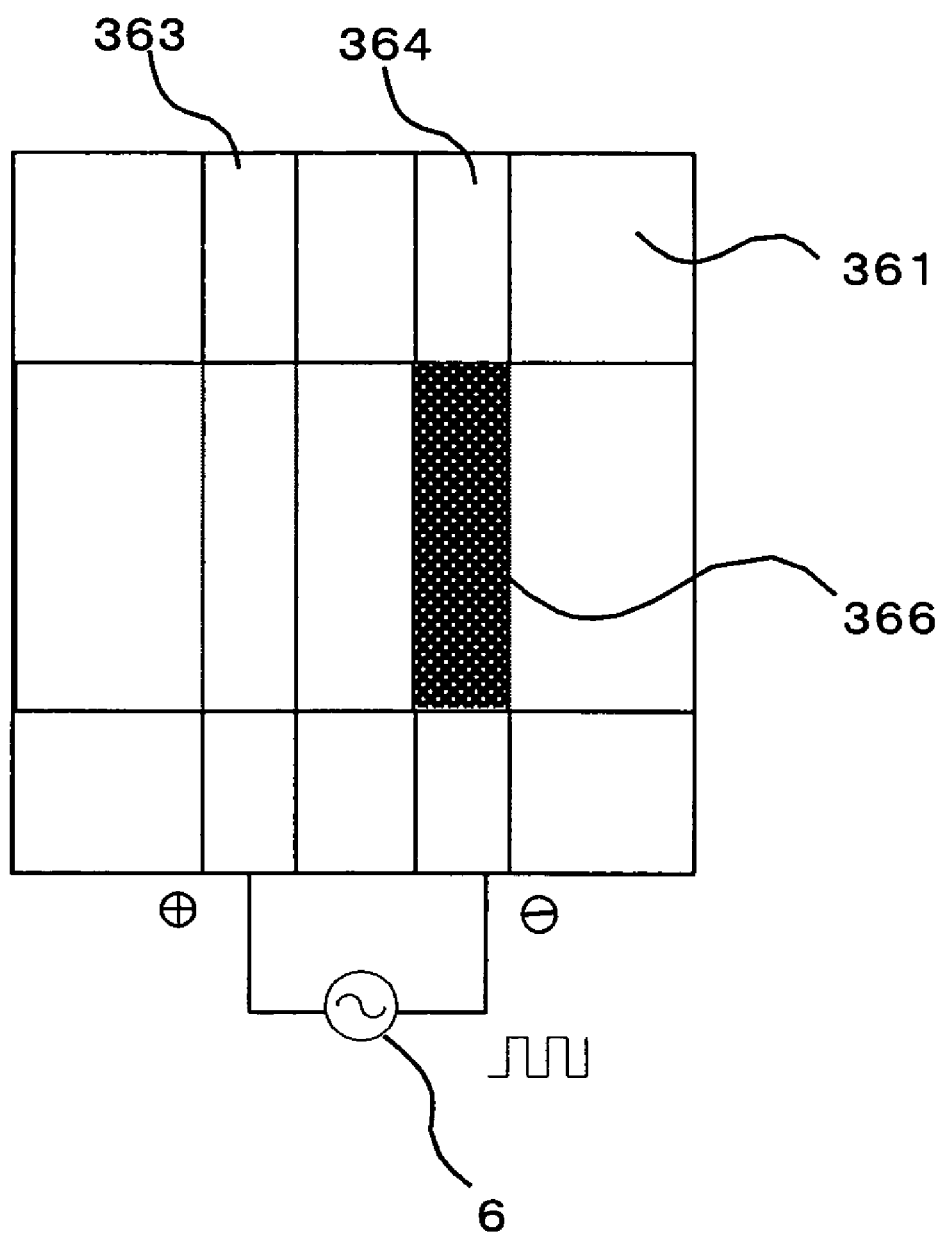
FIG. 12 is a schematic view of an electrochromic device according to one example of the invention.

FIG. 12 is a diagram of the produced device viewed from the upper part of the electrolyte layer. When a voltage of 6V was applied to the first electrode from a power supply 6 between the first ITO electrode 363 and second ITO electrode 364 with the second ITO electrode 364 as reference, it was observed that the electrochromic layer 366 formed on the second ITO electrode 364 turned blue in color.

(Electrochromic Properties)

Figure 13:
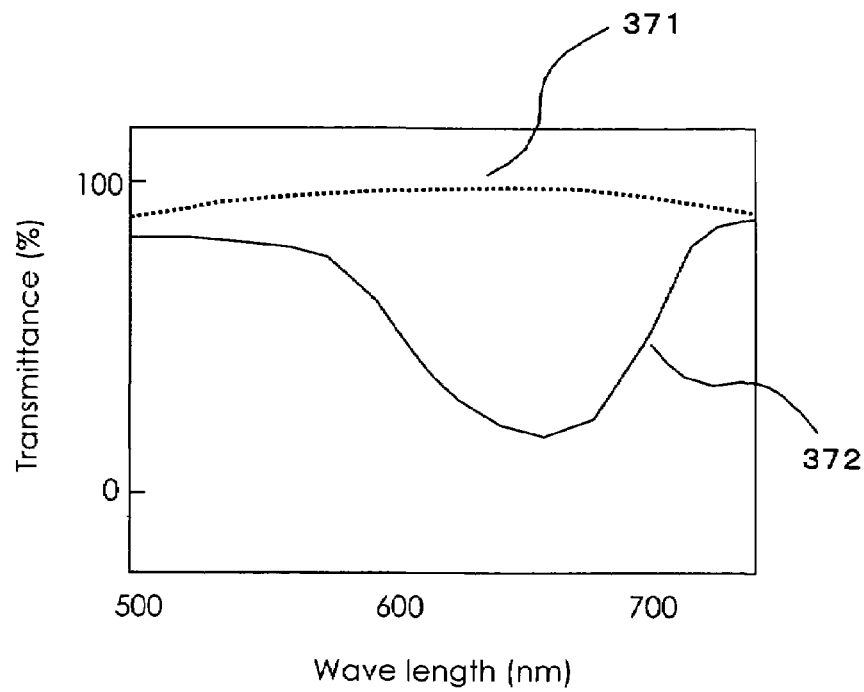
FIG. 13 is a diagram showing a visible light transmission spectrum of an electrochromic device according to one example of the invention.

FIG. 13 shows an absorption spectrum 371 in the decolored state and an absorption spectrum 372 in the colored state of the central part of the electrochromic layer 366 in FIG. 12 when 6V was applied.

Figure 14:
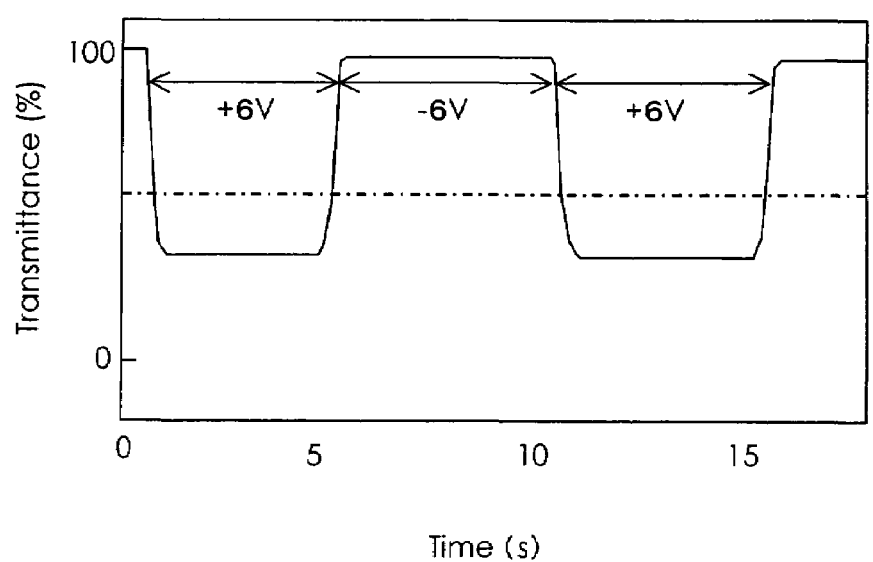
FIG. 14 is a diagram showing a coloration response accompanying the application of a voltage to the electrochromic device according to one example of the invention.

FIG. 14 shows change of transmittance at a wavelength of 650 nm of the central part of the electrochromic layer 366 in FIG. 12, when the voltage was applied. When +6V was applied, the light transmittance fell to 30%, and when -6V was applied, the layer became colorless. The response time for coloration and decoloration was 1 second. When coloration and decoloration were repeated every second, 100,000 repetitions were successfully completed.

(Electrochromic Material)

The electrochromic device could be operated also if a polystyrene sulfonic acid complex of respectively poly(3,4-ethylene dioxypyrrole) or poly(3-hexyl pyrrole) was used as the conductive polymer electrochromic material of the electrochromic layer.

However, polythiophene and polythiophene derivatives which are easily doped by donors such as $Li^+$, and have excellent stability to oxidation in the neutral state, are superior as the conductive polymer electrochromic material. If polythiophene, poly(3,4-propylene dioxythiophene), poly(3,4-dimethoxythiophene), poly(3-hexylthiophene) or poly(3,3-diethyl-3,4-dihydro-2H-thieno[3,4-b][1,4]dioxepin) was used instead of poly(3,4-ethylene dioxythiophene) for the electrochromic device, the device could still be operated. In particular, if poly(3,4-propylene dioxythiophene) or poly(3,3-diethyl-3,4-dihydro-2H-thieno[3,4-b][1,4]dioxepin) was used, at a wavelength of 580 nm the light transmittance fell to 10% and high contrast was obtained.

If, as the electrochromic layer, a 50 nm thick tungstic oxide was formed by magnetron sputtering, an electrochromic device wherein the light transmittance varied from 80% to 10% at a wavelength of 580 nm could be manufactured.

(Electrolyte Layer Material)

The electrochromic device could be operated also if the polymer used for the electrolyte layer was polyethylene oxide, polypropylene oxide, ethylene oxide, epichlorohydrin (70:30) copolymer, polypropylene carbonate or polysiloxane instead of poly(methyl methacrylate).

The electrochromic device could be operated also if the lithium salt used for the electrolyte layer was lithium tetrafluoroborate, lithium hexafluorophosphate, lithium hexafluoroarsenate, lithium hexafluoroantimonate, lithium triflate or N-lithiotrifluoromethane sulfonimide instead of lithium perchlorate.

(Electrode Material)

The electrochromic device could be operated also if the electrode material was gold, aluminum, silver or carbon nanotube.

COMPARATIVE EXAMPLE 1

As a comparison example to Example 1, a prior art in-plane switching device was manufactured using the same materials as those of Example 1. A 150 nm thick electrochromic layer was formed by spin-coating a 5 wt % aqueous solution of a poly(3,4-ethylene dioxythiophene)-polystyrene sulfonic acid complex at 4300 rpm for 60 seconds on a 3 cm square, 1 mm thick insulating glass substrate 361 carrying an ITO electrode 363 and ITO electrode 364 of width 5 mm and thickness 50 nm. A solution of composition 20 wt % polyethylene oxide having a molecular weight of 1 million, 2 wt % lithium perchlorate and 78 wt % tetrahydrofuran was then spin-coated on the remaining exposed part of the substrate at 1000 rpm for 60 seconds to form a 150 nm thick electrolyte layer, and an electrochromic device was thus manufactured.

In the device of Example 1, the coating layer thickness on the substrate is 150 nm, but the in-plane switching device of Comparative Example 1 has a thickness of 300 nm, i.e., twice as high.

EXAMPLE 2

An electrochromic device having the first structure according to the invention was manufactured in exactly the same way as in Example 1, except that tungstic oxide was used for the electrochromic compound, and a photolithography process and RF magnetron sputtering were used to form the electrochromic layer. When this device was connected to a power supply as in Example 1 and a voltage was applied between the electrodes, reversible coloring could be performed.

If the device was manufactured using iridium oxide, nickel oxide, titanium oxide or vanadium pentoxide for the electrochromic compound, reversible coloring could still be performed.

EXAMPLE 3

This example relates to a device panel wherein the pixels in the electrochromic device of the invention are arranged in a matrix, and to an information display using same.

Figure 15:
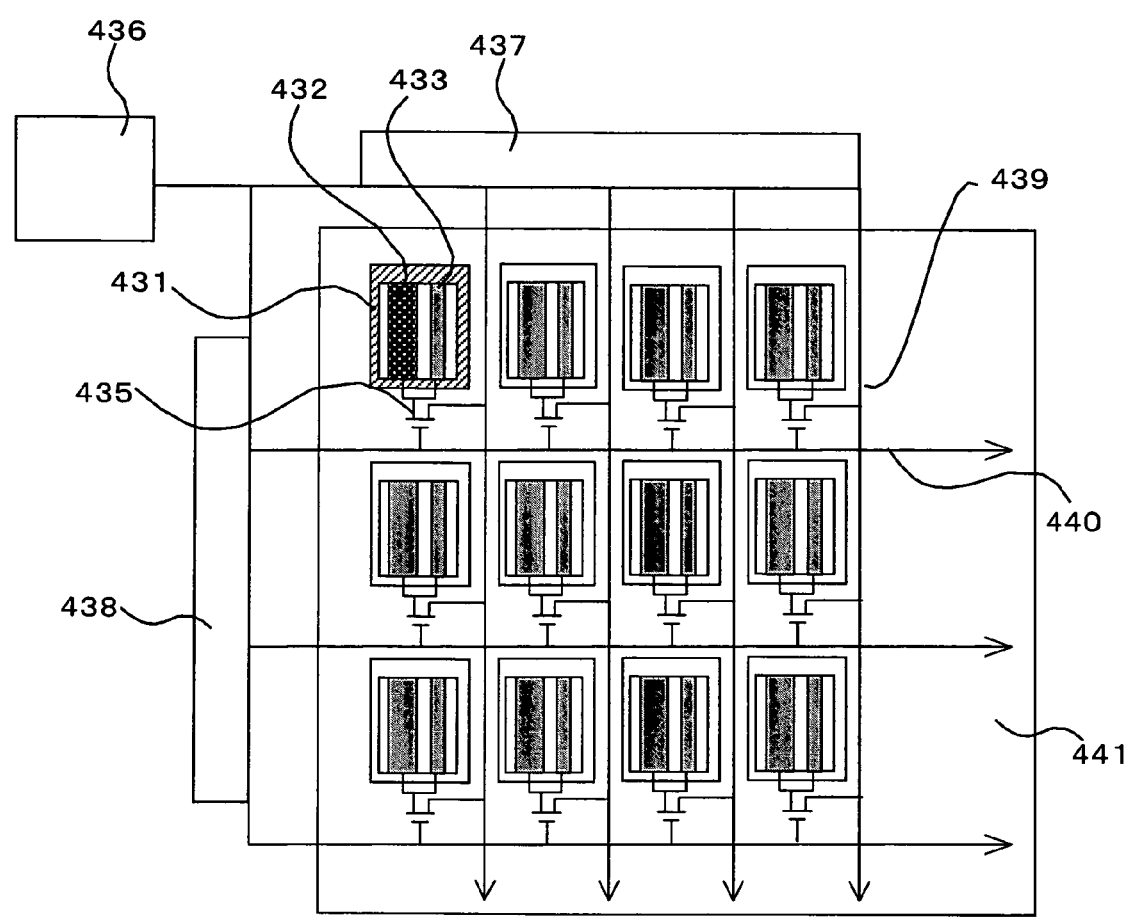
FIG. 15 is a diagram showing the construction of an information display panel using the electrochromic device of the invention.
Figure 16:
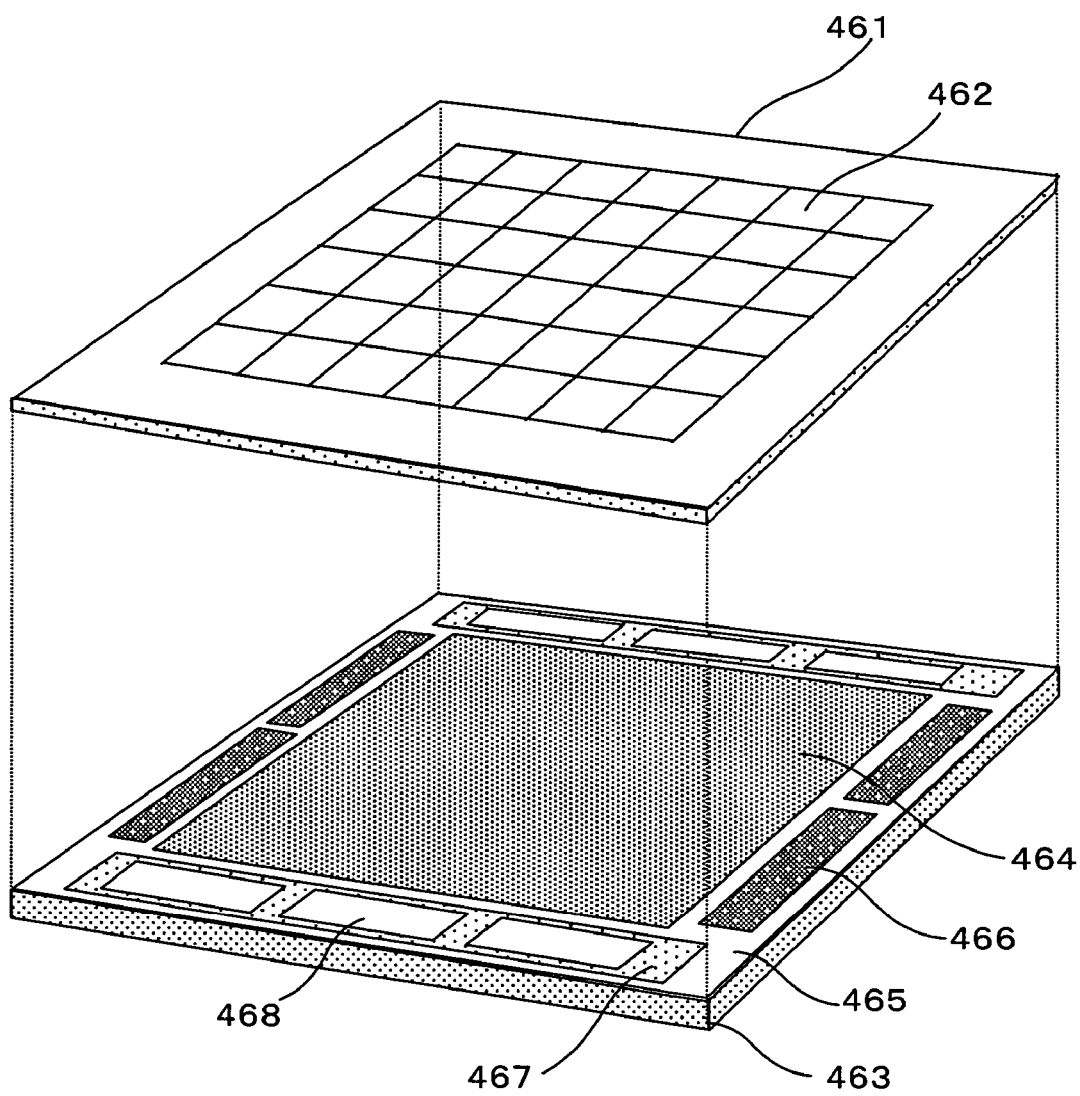
FIG. 16 is a diagram showing the construction of an information display device using the electrochromic device of the invention.

A matrix display panel and device using 12 electrochromic devices, which are shown in FIGS. 15 and 16, were manufactured by the following methods. The materials used are the same as those of Example 1. FIG. 15 shows the construction of the display panel and FIG. 16 shows the construction of the information display.

A silicon thin film is formed on a substrate 463, an integrated circuit comprising a pixel driver region 464, buffer amplifier 465 and gate driver region 466 is provided thereupon, and the whole is connected to an image information display panel 461 comprising pixels 462. 467 is a shift register region and 468 is a data driver region.

The method of manufacturing the display panel is as follows.

A signal wire 439 and gate line 440 were manufactured on a glass substrate. Next, 12 combinations of the first electrode 432 and the second electrode 433 were formed by using a mask and sputtering ITO on the substrate. The thickness of the electrodes was 50 nm. The size of the first electrode 432 was length 9 mm and width 5 mm, the size of the second electrode was length 9 mm and width 1 mm, two electrodes were disposed in parallel in a longitudinal direction, and the distance between electrodes was 1 mm. It was decided to use the first electrode as a pixel. Next, a 200 nm thick electrochromic layer was formed 9 mm vertically and 9 mm horizontally using a printing technique on the first electrode 432, a 200 nm thick electrolyte layer was formed at positions other than the electrochromic layer by positioning, and a panel 441 comprising an arrangement of 12 electrochromic devices 431, a drive transistor and wiring was thus obtained.

In this panel 441, a transistor 435 which applies a voltage to perform electrochromic coloration/decoloration using a gate driver 438 and signal line driver 437 is controlled by an image information signal input 436, and image information is thereby displayed.

Compared to the case of the prior art in-plane switching electrochromic structure, in the structure of this invention the electrochromic layer is formed only in the display part, so the amount of electrochromic material used can be reduced. Also, even if the thickness of the electrochromic layer is the same, the coloring density can be doubled as compared with the prior art.

EXAMPLE 4

This example relates to an electrochromic device using a liquid electrolyte. The substrate, electrodes and electrochromic material were identical to those of Example 1. The electrolyte uses a 0.1M lithium triflate solution of propylene carbonate.

Figure 17:
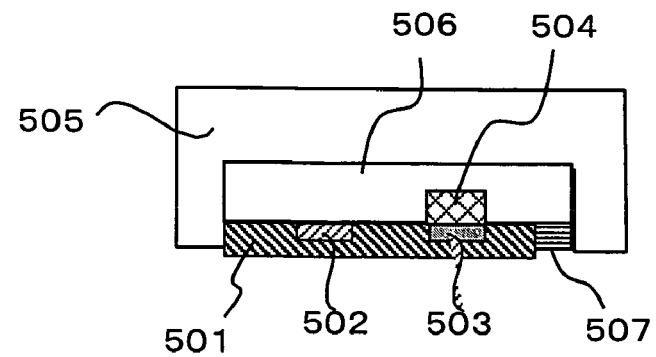
FIGS. 17A and 17B are a cross-sectional view and an aerial view of an electrochromic device according to one example of the invention.
Figure 17:
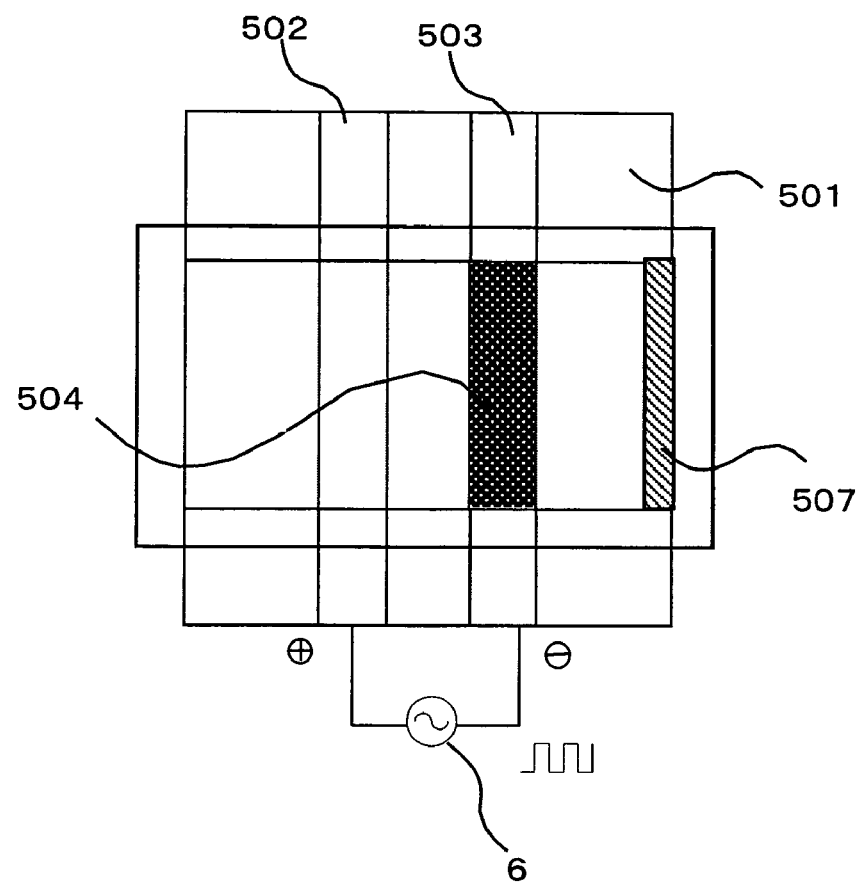

FIG. 17A is a cross-sectional view of a device according to this example. An electrochromic layer 504 of an insulating substrate 501 carrying a first electrode 502 and second electrode 503 is provided on the second electrode 503. A liquid electrolyte 506 is poured between a glass insulating substrate 505 and the electrochromic layer 504 which are surrounded by walls, and sealed by an adhesive 507. FIG. 17B is an aerial view of the device of FIG. 17A. A voltage is applied by the power supply 6 between the first electrode 502 and second electrode 503. The first insulating substrate 501 was a square of side 4 cm and thickness 0.5 mm, the first electrode 502 and second electrode 503 had a width of 5 mm, interval of 4 mm and thickness 30 nm, and the sheet resistance was 50Ω. After hollowing out the center of the 3 cm×6 cm, 8 mm thick glass plate to a depth of 6 mm leaving a circumference of 5 mm, the side walls in the longitudinal direction of the second insulating substrate 505 supporting the liquid electrolyte 506 were filed down by 1 mm to incorporate the first insulating substrate 501. The thickness of the electrochromic layer 504 was 100 nm.

When a voltage of 6V was applied between the first electrode and second electrode with the first electrode positive, the electrochromic layer 504 which was overlapping the second electrode was colored deep blue in 0.1 seconds. At this time, the transmittance of the electrochromic layer 504 decreased by 40% at a wavelength of 600 nm. When the applied voltage was stopped, the colored part returned to the original transparent state in 10 seconds. Also, when a voltage of −2V was applied during decoloration, decoloration occurred in 0.2 seconds. Even after this coloration/decoloration was repeated 100,000 times, decoloration/decoloration could be performed in the same way as in the initial state.

EXAMPLE 5

Figure 18:
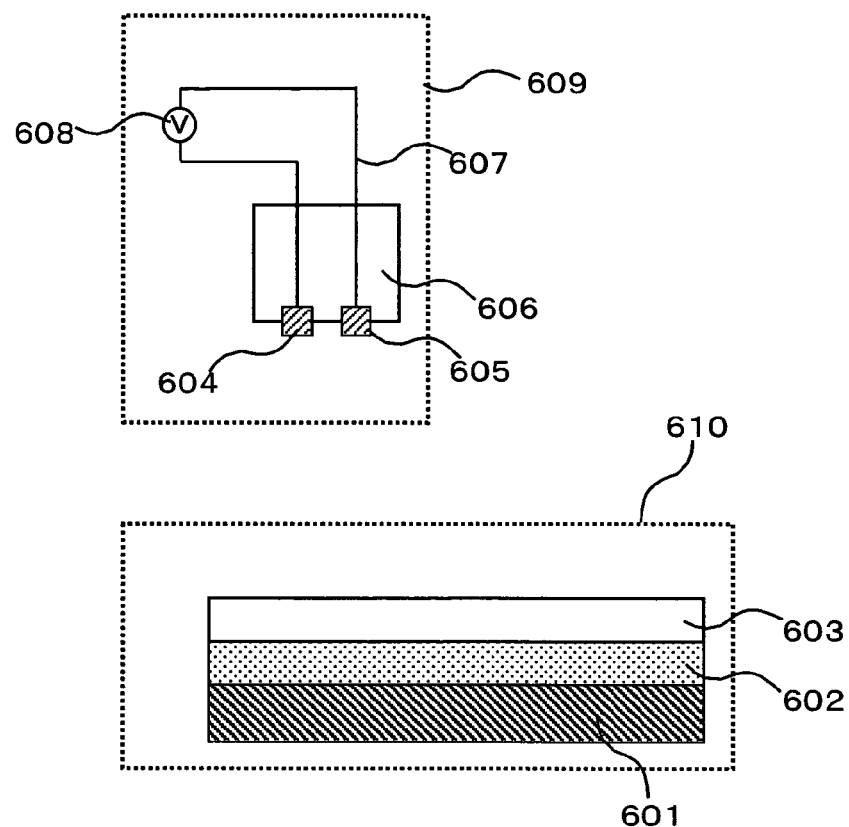
FIG. 18 is a diagram showing the construction of an electrochromic device according to one example of the invention.

This example relates to a novel method of operating the in-plane switching electrochromic device. As shown in FIG. 18, it consists of a probe 609 for inputting recording data or display data, and a recording/display medium 610.

The recording/display medium 610 comprises a substrate 601, electrochromic layer 602 and electrolyte layer 603. The electrochromic layer 602 and electrolyte layer 603 are sequentially formed by printing or the like on the glass or plastic substrate 601. The electrochromic material and electrolyte material described in Example 1 may be used.

The probe 609 comprises a first electrode 604, second electrode 605, insulating member 606, wiring 607 and power supply 608. The electrode material may be gold, ITO or aluminum.

Figure 19:
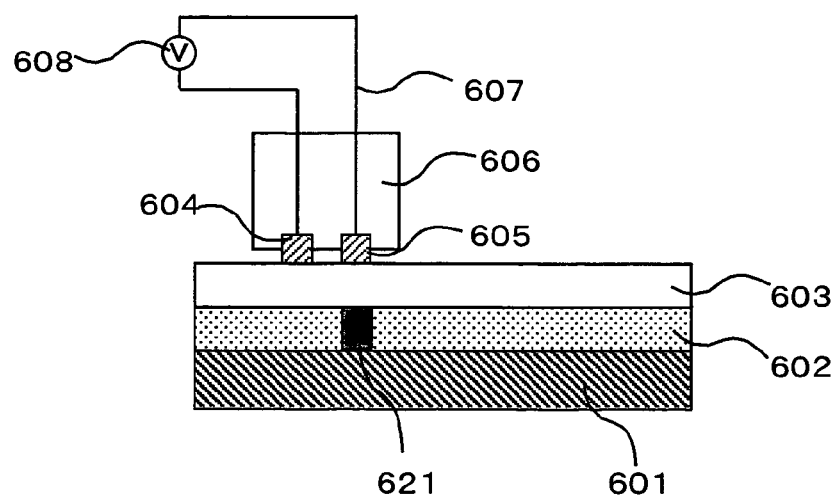
FIG. 19 is a diagram showing the construction of an electrochromic device according to one example of the invention.

FIG. 19 shows what happens when an electrochromic operation is performed by the in-plane switching structure using the probe and medium in FIG. 18. Here, the electrochromic material was PEDOT/PSS. The thickness of the electrochromic layer 602 was 100 nm, and the thickness of the electrolyte layer 603 comprising PEO and lithium triflate was 500 nm.

Information write was performed as follows. When the first electrode 604 and second electrode 605 were brought in contact with the electrolyte layer 603 of the recording/display medium 610, and a voltage of 10V was applied with the first electrode 604 positive, a part 621 immediately beneath the second electrode 605 was colored blue. The probe 609 was moved to change the contact part so that another part was colored, and write was thereby performed as desired on the medium.

Decoloration was performed as follows. When application of the voltage was stopped, the colored part gradually lost its color, and after 1 hour was again colorless. When the probe and medium were brought into contact in the same way as when write was performed and a voltage of 10V or less was applied in the reverse direction, the colored part was decolored and erased. Even when coloration and decoloration were performed repeatedly, there was no deterioration after at least 10,000 times.

In the device of this example, it is particularly desirable to use a combination of an electrochromic compound and an electrolyte having memory properties so that, after producing the initial coloration by applying the voltage, it does not naturally lose its color even if the voltage ceases to be applied.

Specifically, tungsten oxide and tantalum pentoxide may be mentioned. Also, when the lamination sequence of the electrolyte layer and electrochromic layer in the medium was reversed, information write and erase could still be performed.

EXAMPLE 6

This example relates to an information recording medium and information recording method using the in-plane switching electrochromic device structure of the invention.

(Construction and Manufacture)

Figure 20:
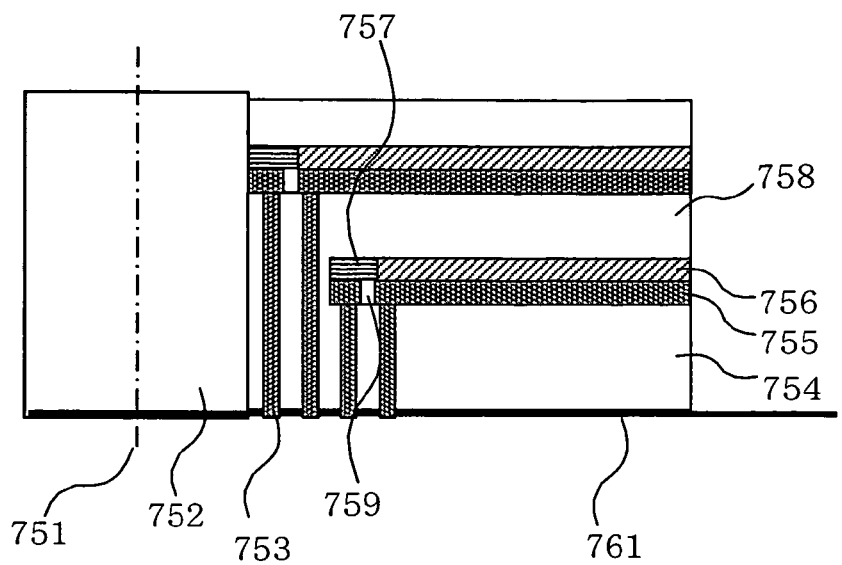
FIG. 20 is a cross-sectional view of an information recording medium according to one example of the invention.

FIG. 20 is a diagram showing a cross-sectional structure of the center part of a disk-shaped information recording medium according to Example 1 of this invention. 751 is a center line of the disk, 752 is a central hole of the disk, 753 is an electrode which, when installed in a disk sustainer, is used to apply a voltage to color the electrochromic layer in contact with the electrode on the disk sustainer side, 754 is an insulating part comprising polycarbonate, 755 is a transparent electrode, 756 is an electrochromic layer which colors during recording, 757 is an electrolyte layer, 758 is an insulating part, and 759 is an insulating part for separating the transparent electrodes. The electrochromic layer 756 which is colored to perform recording when a voltage is applied from the electrodes actually has a structure comprising lands and grooves, but in FIG. 20, these are not shown.

Figure 21:
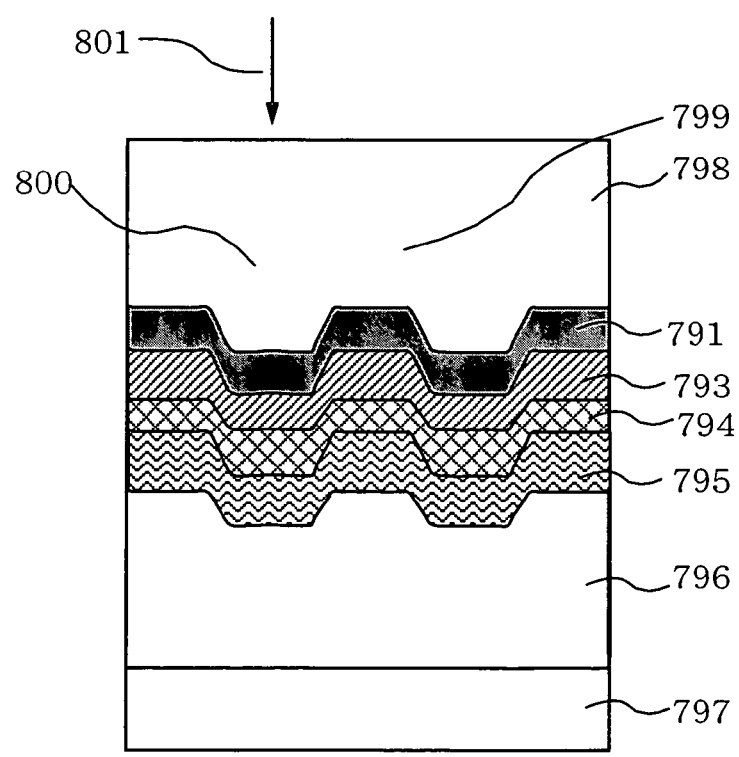
FIG. 21 is a cross-sectional view of an information recording medium according to one example of the invention.
Figure 22:
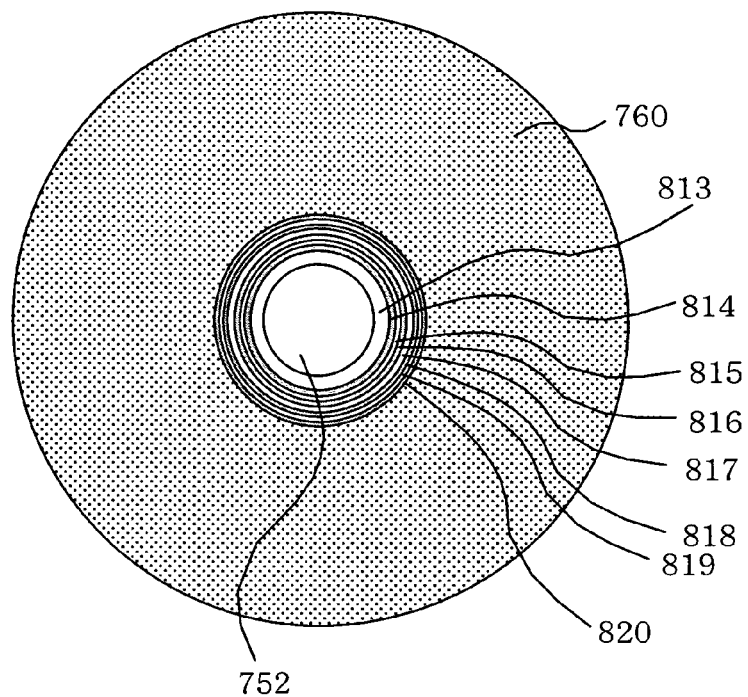
FIG. 22 is a view of an information recording device according to the invention from underneath.

FIG. 21 is an enlargement of part of the disk recording part. FIG. 22 is a view from a surface 761 underneath the information recording medium shown in FIG. 20. The information recording medium has an identical shape to an optical disc such as a DVD, which from the inner circumference surrounding the central hole part 752 of the disk to the outer circumference, comprises an insulating part 813, electrode 814, insulating part 815 and electrode 816 in that order. The electrode 814 and electrode 816 are electrically separated and insulated by the insulating part 815, and form a pair which permits coloration/decoloration of the recording layer by applying a voltage. Towards the outer circumference, the disk comprises an insulating part 817, electrode 818, insulating part 819 and electrode 820 disposed in that order.

A recording/reproducing light 801 impinges on the disk through the substrate 798 from above. Normally, recording/reproducing is usually performed on a part known as a groove 799 of a projection viewed from the light spot, but in this example, the case is shown where recording is performed on a land 800.

The electrochromic material used for the electrochromic layer 794 was an aqueous dispersion of poly(3,4-ethylene dioxythiophene) (0.5 wt %) and polyvinyl sulfonate (0.8 wt %). For the electrolyte layer 793, an acetonitrile solution of polymethylmethacrylate (number average molecular weight 30,000) (5 wt %), propylene carbonate (15 wt %) and lithium perchlorate (7 wt %) was used. If a compound film of an element having a smaller ionic radius than Li such as $SiO_2$ or $GeO_2$ having a film thickness of about 1 to 5 nm is disposed between the transparent electrode 795 and electrochromic layer 796, penetration and passage of Li into the transparent electrode can be suppressed, which is preferred. However, the applied voltage must be increased by several volts. 791 is a protective layer, 796 is an ultraviolet curing resin layer and 797 is a bonding protective substrate.

The electrode on the lower surface of the disk is exposed on the top surface, and is positioned and brought into contact with the electrode installed in the disk sustainer. The electrode on the disk sustainer side is supplied by the circuit board of the recording device by combining plural brushes and rings. Power may also be supplied by another method.

Regarding electrochromic properties, if the disk employed identical materials to those of Example 1, the absorption wavelength and response were identical to those shown in Example 1.

(Recording/Reproducing)

Figure 23:
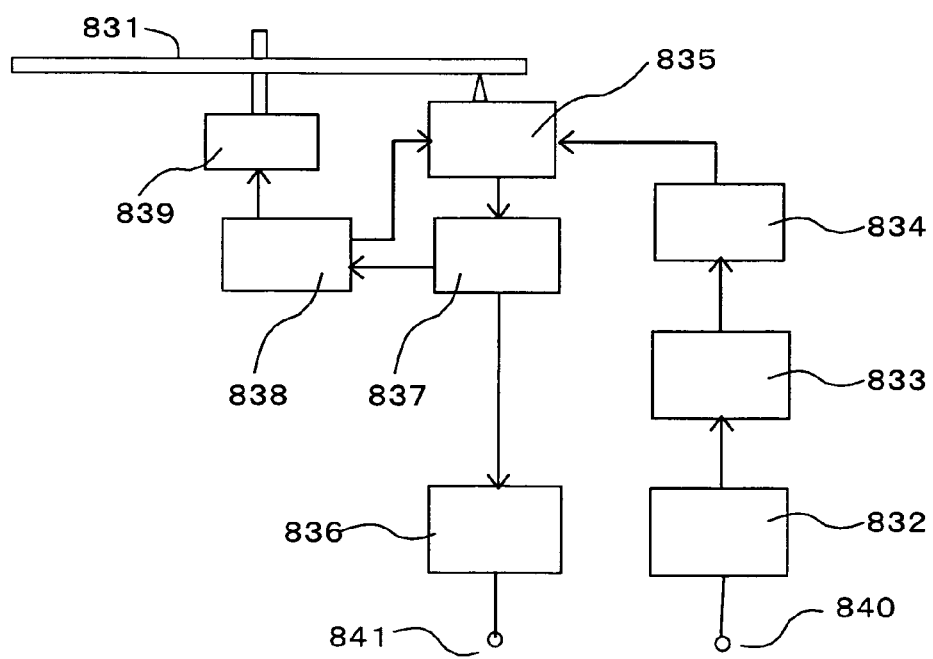
FIG. 23 is a block diagram of an applied voltage control circuit which controls voltage application to a medium according to one example of the invention.

Information recording/reproducing was performed on the aforesaid information storage medium. The information recording/reproducing operation will now be described referring to FIG. 23. First, the case will be described where the motor control used for recording/reproducing was the ZCAV (Zoned Constant Linear Velocity) method wherein the disk rotation speed is varied for each zone. In FIG. 23, 838 is a L/G servo circuit, 839 is a motor, 840 is a signal input and 841 is a signal output.

Information from outside the recording device is transferred to an 8-16 modulator 832 in units of 8 bits. When the information is recorded on an information recording medium (hereafter, optical disk) 831, recording is performed by a modulation method wherein 8 bits of information are converted to 16 bits, i.e., the so-called 8-16 modulation method. According to this modulation method, information of 3 T-14 T mark lengths which are made to correspond with 8 bits of information, is recorded. The 8-16 modulator 832 in the figure performs this modulation. Here, T represents the clock cycle during information recording. The disk was rotated so that its speed relative to the light spot was a linear velocity of approx. 8 m/s.

The 3 T-14 T digital signal converted by the 8-16 modulator 832 is transferred to a recording waveform generating circuit 833, and a multipulse recording waveform is generated. At this time, the power level used to form the recording mark was 5 mW, the intermediate power level which could erase the recording mark was 2 mW, and the reduced power level was 0.1 mW. The laser power for forming the recording mark can be reduced if the applied voltage to the selected electrochromic layer is increased, and satisfactory recording was performed within the range of 0.5 mW to 5 mW. Even if the linear velocity was changed from 8 m/s, there was not much variation within this range. Read was performed at 1 mW without applying a voltage to the electrochromic layer. Practically useful read was performed within the range of 0.2 mW to 2 mW. When read was performed for a long time at a power exceeding 2 mW, the recorded data deteriorated.

Also, in the aforesaid recording waveform generating circuit, the 3 T-14 T signal is made to correspond alternately to "0" and "1" in a time sequence. Areas irradiated by pulses of high power level suffer a decrease of electrochromic properties, and coloration becomes difficult. The aforesaid recording waveform generating circuit 833 has a multipulse waveform table corresponding to a system (adaptive recording waveform control) wherein, when a series of high power pulses is formed to form the marks, the leading pulse width and trailing pulse width of the multipulse waveform are varied according to the length of the spaces before and after the marks. Consequently, a multipulse recording waveform is generated wherein the effect of inter-mark thermal interference which occurs between marks can be completely eliminated. The recording waveform generated by the recording waveform generating circuit 833 is transferred to the laser driver 834, and the laser driver 834 causes the semiconductor laser in the optical head 835 to emit light based on this recording waveform.

The optical head 835 mounted in this recording device uses a semiconductor laser having an optical wavelength of 660 nm as the information recording laser beam. Information recording was performed by focusing this laser light on the information layer of the aforesaid optical disc 831 by an objective lens having a lens NA of 0.65.

In the case of an information layer using a conductive polymer electrochromic material, the reflectivity of the medium is higher in the colored state, and the reflectivity of the region which is recorded and loses its coloration, is low. A voltage of 3V is continuously applied during laser light irradiation.

In the information recording medium of this invention, an optical reflectance contrast ratio of approximately 2:1 was obtained between the recording marks and other parts. If the contrast ratio falls below this value, the disturbance due to noise in the reproducing signal exceeds the upper limiting value of 9%, which is outside the range of practically useful recording signal quality. If the transparent electrode is $(SiO_2)_{40}(In_2O_3)_{55}(SnO_2)_5$ which contains $SiO_2$, the refractive index of the electrode layer decreases which is optically advantageous, and the contrast ratio becomes 2.5:1.

Plural optical spots were formed from a single optical head or plural optical heads on the same track or a different recording track, and simultaneous recording could also easily be performed. This recording device corresponds to a method of recording information on the lands of the grooves and lands (modification of in-groove recording method).

Reproducing of the recorded information was also performed using the aforesaid optical head 835. The recorded marks were irradiated by the laser beam, and a reproducing signal was obtained by detecting the reflected light from the marks and parts other than the marks. The amplitude of this reproducing signal was increased by a pre-amplifier circuit 837, and in the 8-16 demodulator 836, it was converted to 8-bit information every 16 bits. The above procedure completes reproducing of the recorded marks.

If mark edge recording was performed under the aforesaid conditions, the mark length of the 3 T mark which is the shortest mark is approximately 0.20 μm, and the mark length of the 14 T mark which is the longest mark is approximately 1.96 μm. The recording signal contains dummy data wherein 4 T marks and 4 T spaces are repeated in the information signal leader and trailer. The leader also contains a VFO.

(Mark Edge Recording)

For DVD-RAM and DVD-RW, the mark edge recording method is used which can realize high density recording. In mark edge recording, the positions on both sides of the recording mark formed in the recording film are made to correspond to the 1 of digital data, consequently the length of the shortest recording mark can also be made to correspond not to 1 but to 2-3 reference clocks so as to achieve higher density. In a DVD-RAM the 8-16 modulation method is used, and a correspondence is made with 3 reference clocks. The mark edge recording method, compared to mark position recording wherein the center position of a circular recording mark is made to correspond to the 1 of digital data, has the advantage that even if the recording mark is not made very small, high density recording is possible. However, the information recording medium must have only a small waveform distortion.

(ZCLV Recording Method, CAV Recording Method)

In an information recording medium using an electrochromic material, if the recording waveform is not changed, it is desirable to record at an optimum linear speed to obtain satisfactory recording/reproducing properties. However, when recording tracks having different recording radii on the disk are accessed, it takes some time to change the rotation speed to make the linear speed the same. Hence, in a DVD-RAM, the ZCLV (Zoned Constant Linear Velocity) method is adopted wherein the disk radial direction is divided into 24 zones so that the access speed does not become too small, the rotation speed is fixed within each zone, and the rotation speed is changed only when it is required to access a different zone. In this method, the innermost track and outermost track within a zone have slightly different linear speeds, so recording can be performed at effectively maximum density over the whole disk.

On the other hand, from the viewpoint that the rotation speed does not have to be changed even if there is a large access in the radial direction, the CAV recording method where the rotation speed is fixed is preferred, and since power consumption can be suppressed when the rotation speed is changed, it is suitable also for mobile devices. In the invention, a fixed heating time is obtained regardless of the radial position as described above, so CAV recording can also be made easier.

(Electrode Material)

The electrode material must have optical properties such that it does not absorb at the recording laser light wavelength, i.e., such that it is transparent. The transparent electrode material preferably has the composition $(In_2O_3)_x(SnO_2)_{1-x}$, where x is 5% to 99%, but from the viewpoint of resistance value, it is more preferred that x is 90% to 98%, that 50% or less of $SiO_2$ is added thereto in terms of mole %, or that 2 to 5% of another oxide such as $Sb_2O_3$ is added to $SnO_2$ in terms of mole %. Fluorine-doped $SnO_2$ has a low resistance, high light transmittance and is convenient to use. Alternatively, IZO (indium zinc oxide) has the advantage that it can be manufactured without many surface imperfections, and can be used as the electrode layer. For the electrode layer at the back viewed from the incidence side of the laser light to the information storage medium, high transparency is not necessarily required, so a metal suitable for optical disk use can also be used. When the metal layer having a high reflectance and thermal conductivity is Al or Al alloy, if it is a high thermal conductivity material wherein added elements such as Cr, Ti are present to 4% atomic percent or less, temperature rise of the substrate surface can be prevented which is preferred. Next, a layer of a single element such as Au, Ag, Cu, Ni, Fe, Co, Cr, Ti, Pd, Pt, W, Ta, Mo, Sb, Bi, Dy, Cd, Mn, Mg, V, an alloy such as Au alloy, Ag alloy, Cu alloy, Pd alloy, Pt alloy, Sb—Bi, SUS or Ni—Cr having these elements as main ingredient, or alloys of these alloys, may also be used. Hence, the electrode/reflecting layer comprises a metal element, semi-metal element, an alloy or a mixture thereof. Among these, Cu, Ag, Au alone, Cu alloy, Ag alloy and particularly an allow wherein the addition element such as Pd, Cu is present to the extent of 8 atomic % or less, or an alloy having high thermal conductivity such as Au alloy, suppresses the thermal degradation of the organic material. A conductive organic material such as a polythiophene derivative, polypyrrole derivative or polyacetylene which does not have an absorption band in the visible region and has a narrow band gap structure, may also be used.

(Substrate)

In this example, a polycarbonate substrate having a tracking groove directly on the top surface was used. A substrate having a tracking groove is a substrate having a groove of λ/15n (n is the refractive index of the substrate material) or more where the recording/reproducing wavelength is λ, on all or part of the substrate top surface. The groove may be formed continuously over the whole circumference, or maybe split midway. It was found that when the groove depth was approximately λ/12n, there was a suitable balance between tracking and noise. Also, the groove width may be different according to the location. The substrate may have a format wherein recording/reproducing is performed on both the grooves and the lands, or a format wherein recording is performed on only one thereof. In the type where recording is performed on only the grooves, it is preferred that the track pitch is in the vicinity of 0.7 times the NA of the wavelength/focusing lens, and the groove width is in the vicinity of ½ thereof.

(Recording Laser Power)

In the information storage medium of this example, when the recording linear speed was 8 m/s, the recording laser power was set to 10 mW.

(Read Laser Power)

The read laser power was set to 1 mW. When the laser light source uses for example a 4 device array laser, the data transfer speed can be increased by 4 times.

(Electrochromic Material)

If the electrochromic material used for the recording layer was poly(3,4-ethylenedioxypyrrole), poly(3-hexylpyrrole) or tungsten oxide, recording/reproducing could still be performed.

However, as the conductive polymer electrochromic material, poly thiophene and polythiophene derivatives, which are easily doped by donors such as $Li^+$ and have excellent stability to oxidation in the neutral state, are superior. When the information storage medium used polythiophene, poly(3,4-propylene dioxythiophene), poly(3,4 dimethoxythiophene) or poly(3-hexylthiophene) instead of poly(3,4-ethylenedioxythiophene), recording/reproducing could still be performed.

(Material of Electrolyte Layer)

In the information storage medium, when polyethylene oxide, polypropylene oxide, ethylene oxide/epichlorohydrin (70:30) copolymer, polyethylene carbonate, polypropylene carbonate or polysiloxane was used instead of poly (methylmethacrylate) as the polymer of the electrolyte layer, recording/reproducing could still be performed.

When lithium triflate, lithium hexafluorophosphate, lithium tetra-fluoroborate or N-lithiotrifluoromethane sulfonimide was used instead of lithium perchlorate as the electrolyte salt, recording/reproducing could still be performed.

EXAMPLE 7

This example relates to an information recording medium wherein a short wavelength laser can be used for recording/reading. The structure of the medium and its manufacturing method are identical to those of Example 6.

For the electrochromic layer, an aqueous dispersion of poly (3,4-dimethoxythiophene) (0.5 wt %) and polyvinyl sulfonate (0.8 wt %) was used. For the electrolyte layer, a cyclohexanone solution of polymethylmethacrylate (number average molecular weight 30,000) (5 wt %), propylene carbonate (15 wt %) or lithium perchlorate (7 wt %) was used. A reflecting layer comprising a $W_{80}Ti_{20}$ film was formed to a film thickness of 50 nm in the electrolyte layer. A laminated film was formed by a magnetron sputtering device. A protective layer having a thickness of 0.5 mm was formed using a UV resin on the second electrode.

Figure 24:
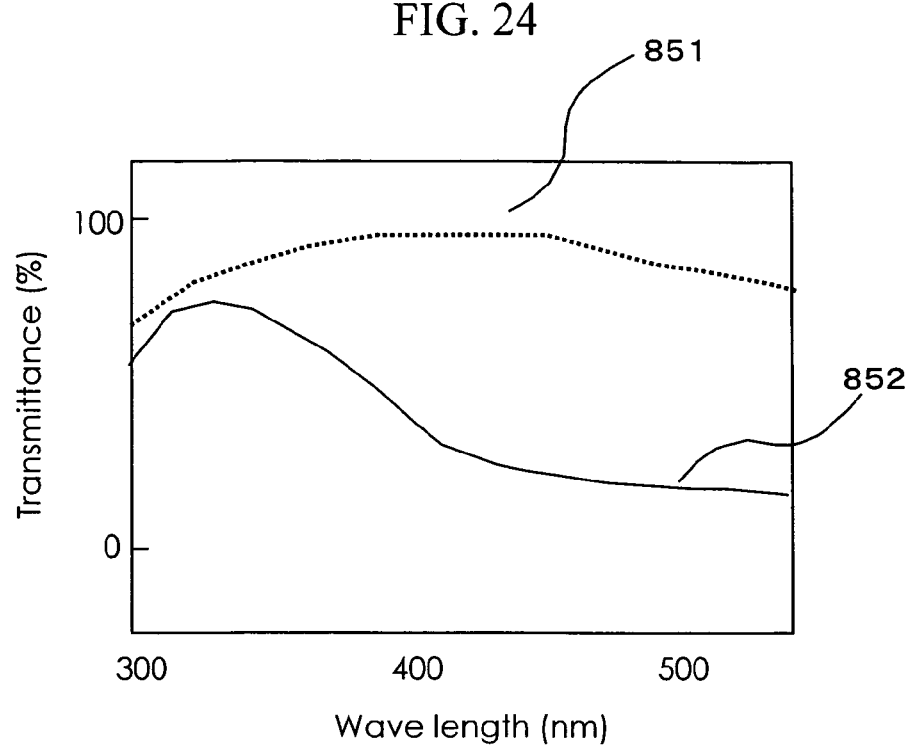
FIG. 24 is a diagram showing a visible light transmission spectrum of an information recording medium according to one example of the invention.

FIG. 24 shows the absorption spectrum of the electrochromic layer of an information recording medium according to this example. The voltage was measured at one minute after it started to be applied, when it had reached the steady state. The dotted line 851 in FIG. 24 is the spectrum when a voltage was not applied, and the solid line 852 is the spectrum when +3.0V was applied to produce coloration. When +3.0V was applied, an absorption band appeared in the vicinity of a wavelength of 400 nm. Therefore, this medium is suitable for recording using a violet semiconductor laser of wavelength of 400 nm.

Recording/reproducing of the manufactured information storage medium was performed in the same way as in Example 6. The laser beam used for information recording was a semiconductor laser having an optical wavelength of 400 nm. This laser beam was focused on the information layer by an objective lens having a lens NA of 0.65, information recording was performed by irradiating with a laser beam of 6 mW intensity, and reproducing was performed by a laser beam of 0.5 mW intensity.

In the case of an information storage medium wherein poly(3,4-ethoxythiophene) or poly(3-butylthiophene) was used as the conductive polymer electrochromic material, recording/reproducing could still be performed.

EXAMPLE 8

This example relates to a multilayer information storage medium and a recording device using same.

Figure 25:
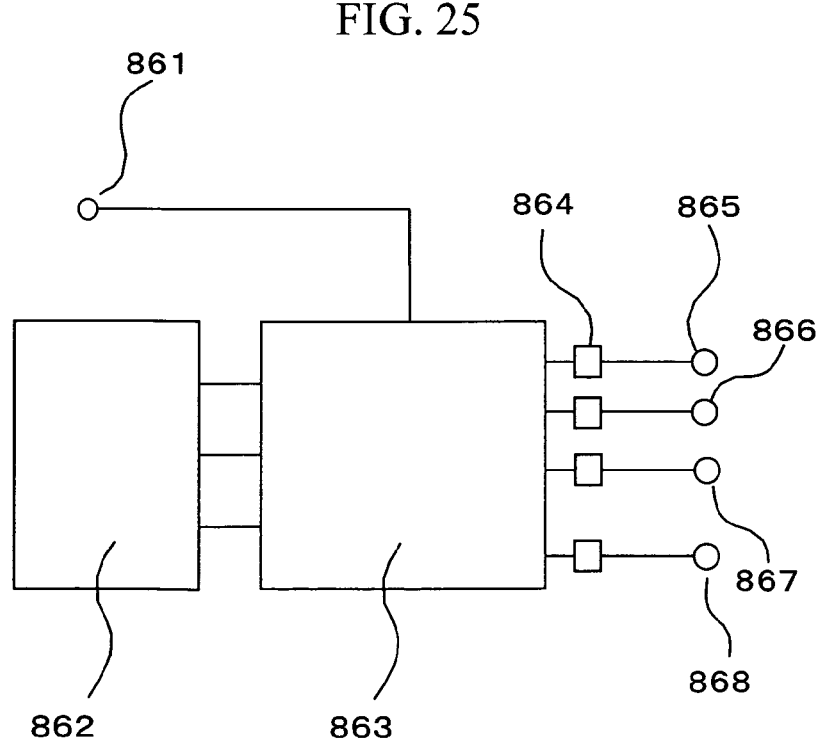
FIG. 25 is a block diagram of an applied voltage control circuit which controls voltage application to a medium according to one example of the invention.

FIG. 25 shows the block diagram of the recording device control circuit. A voltage and a signal for selecting a layer of the information storage medium were supplied from the recording device to three slip rings on a rotation axis. The circuit of FIG. 25 including a capacitor is housed in the hollow part of the disk sustainer, and wiring to each layer on the right-hand side of the circuit block diagram is connected to the electrode of the disk sustainer via an applied voltage change-over/control circuit. In FIG. 25, 861 is a layer selection signal, 862 is a variable power supply, 863 is a layer selection circuit, 864 is a current controller, 865 is a first layer selection signal, 866 is a second layer selection signal, 867 is a third layer selection signal and 868 is a fourth layer selection signal.

Figure 26:
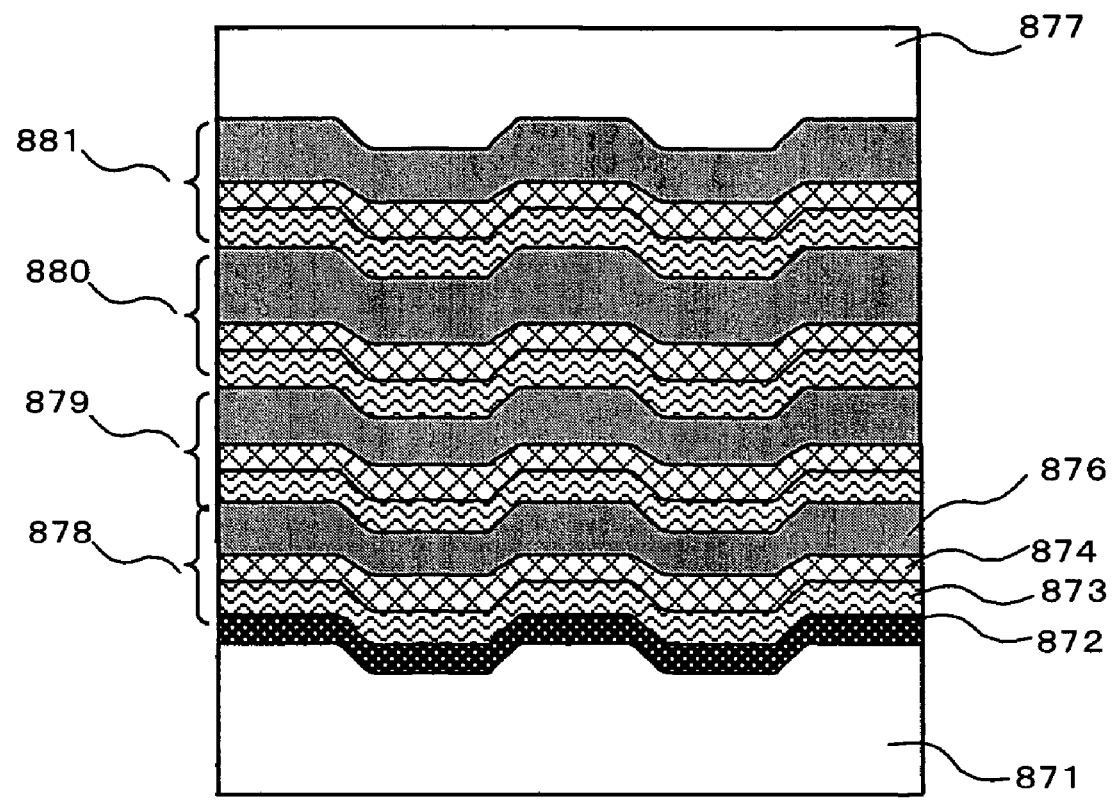
FIG. 26 is a cross-sectional view of an information recording medium according to one example of the invention.

The information recording medium has the same basic construction as that of Example 6. As shown in FIG. 26, which is an enlargement of the part where recording is performed, a tracking groove for in-groove recording having a track pitch of 0.74 μm, a depth of 23 nm and groove width of 0.35 μm is provided on a top surface of diameter 12 cm and thickness 0.6 mm. A first layer 878 was formed in the order of $SiO_2$ layer (10 nm) 872, IZO transparent electrode (30 nm) 873 and electrochromic layer (80 nm) 874 on a polycarbonate substrate 871. After forming a $ZnS/SiO_2$ insulating layer (100 nm) 876 thereupon, a second layer 879, third layer 880 and fourth layer 881 were formed in the same way, and a polycarbonate substrate 877 having a diameter of 120 mm and thickness 0.6 mm was stuck thereupon. Light was arranged to be incident from this bonding substrate side. The material used for the electrochromic layer 874 was identical to that of Example 1.

The recording/reproducing method was identical to that of Example 6. When, while irradiating with laser light of wavelength of 660 nm, a voltage was applied to color the information layer on which it was desired to perform recording or read, this layer alone was colored and the laser light was absorbed and reflected, so information recording or read could be selectively performed.

The multilayer films can normally all be placed within the focal depth of the focusing lens, but recording/reproducing can also be performed on each layer while varying the focal point by enclosing a spacer layer of thickness 20-40 μm every several layers (e.g., every three layers). In this case, if two or more spacer layers are used, it is preferred to install a device which compensates spherical aberration in the optical system.

EXAMPLE 9

This example relates to a card type optical memory comprising plural electrochromic layers. The materials used for the electrolyte layer and electrochromic layer, and the method of forming them, were identical to those of Example 1.

The multilayer optical memory of this example comprises electrochromic unit cells shown in FIGS. 27A and 27B disposed in three dimensions. The electrochromic unit cell shown in FIG. 27A is formed by electrical connection between a first electrode 932 of width 200 nm and length 10 μm which is a transparent electrode, and an interconnection 933 (width 100 nm) to the first electrode 932, on an insulating glass substrate 931. This interconnection 933 is of aluminum. A 1 mm square second electrode 934 and interconnection 935 (width 500 nm) to the second electrode were formed at a distance of 500 nm to the first electrode 932. This interconnection 935 is also of aluminum.

FIG. 27B is a cross-sectional view through a center horizontal line 936 of this electrochromic unit cell. After forming the first electrode 542, second electrode 943 and wiring on a glass substrate 541, an electrolyte layer 944 (thickness 200 nm) and electrochromic layer 945 (thickness 200 nm) were formed in that order by spin-coating and a subsequent heating step. A polyvinyl alcohol layer of thickness 300 nm was then formed as an insulating protection layer 946 thereupon. The first electrode 932 was used as a reference electrode for coloring/decoloring, and recorded information was written on the second electrode 934 which had a relatively large surface area.

Figure 27:
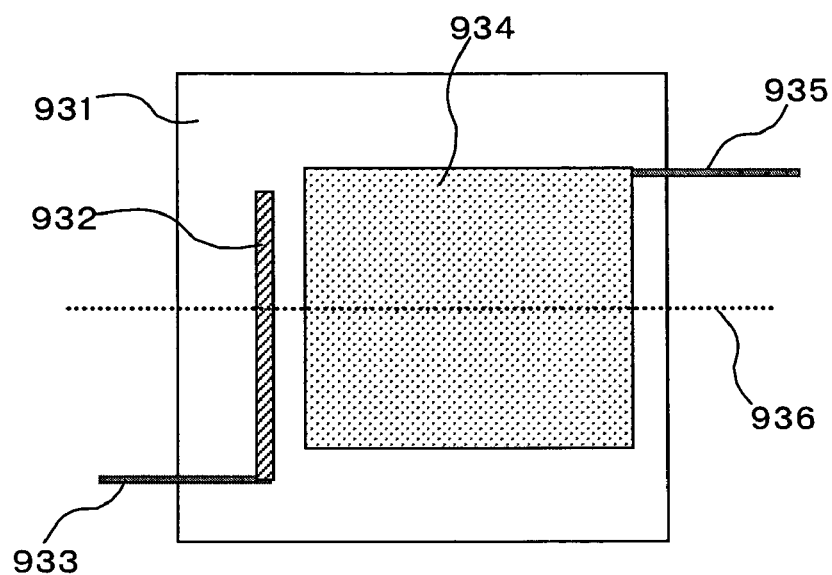
FIGS. 27A and 27B are an aerial view and a cross-sectional view of an information recording medium according to one example of the invention.
Figure 27:
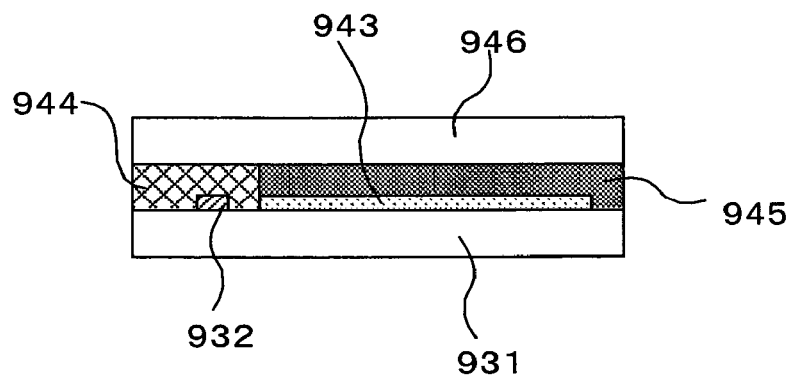
Figure 28:
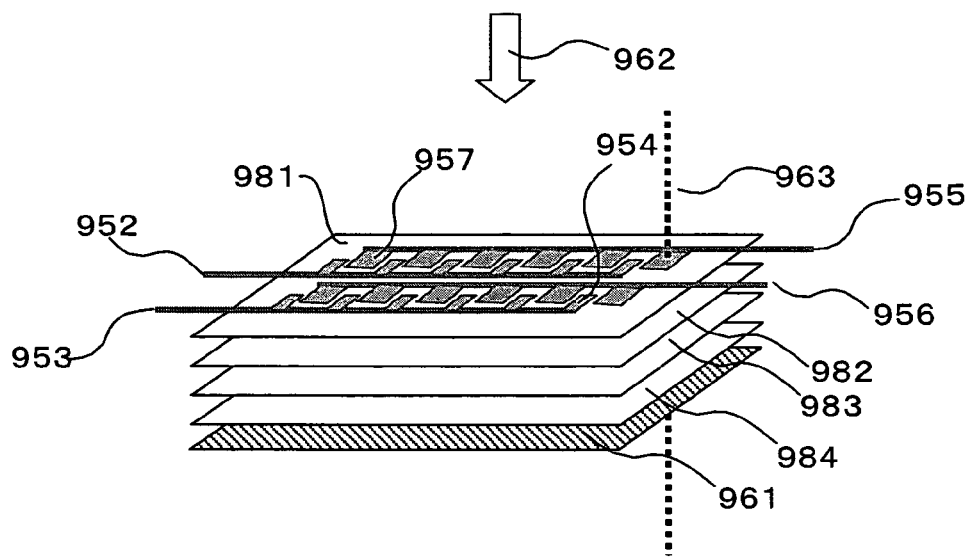
FIG. 28 is a diagram showing the construction of an information recording medium according to one example of the invention.

The electrochromic unit cells shown in FIG. 27, as shown in FIG. 28, are arranged in two dimensions in the same layer. FIG. 28 shows the structure of an optical memory comprising four electrochromic devices laminated together, each comprising 2 rows of 6 cells, in the same layer. In FIG. 28, the horizontal 6 cell arrangement, for a first electrode group 954, supplies electricity from a power supply by an interconnection 952 and interconnection 953. For a second electrode group 957, electricity is supplied from the power supply by an interconnection 955 and interconnection 956. Underneath the 4-layer laminate of the first layer 981, second layer 982, third layer 983 and fourth layer 984, an aluminium reflecting layer (thickness 50 nm) and polycarbonate lower protection layer (thickness 500 μm) 961 were formed.

Figure 29:
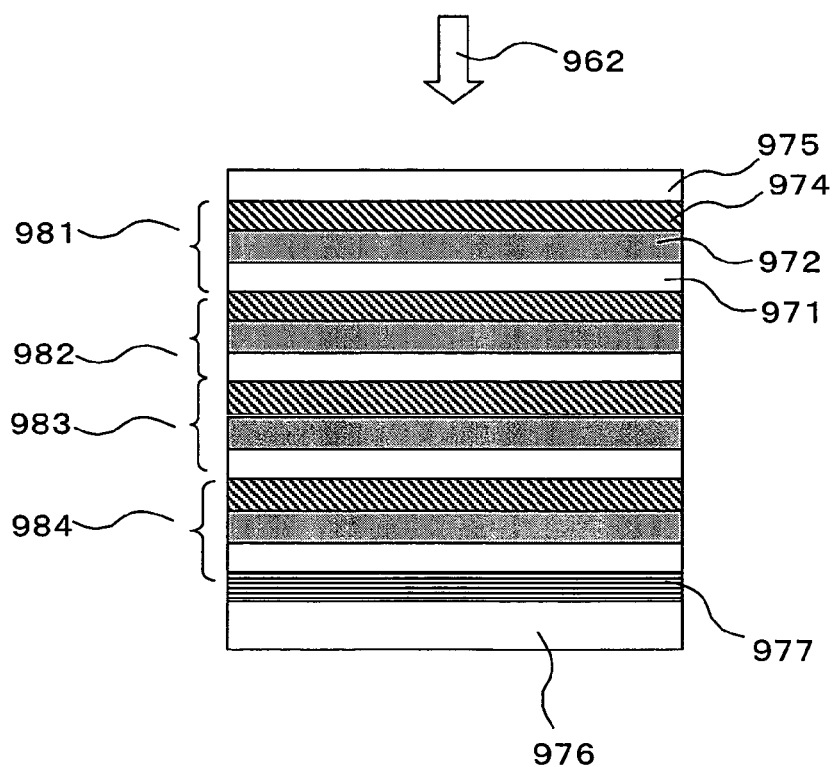
FIG. 29 is a cross-sectional view of an information recording medium according to one example of the invention.

FIG. 29 shows a cross-sectional view at the position of a through-line 963 of the multi-layer optical memory of FIG. 28. The layer structure comprising an insulating layer 971, transparent electrode 972 and electrochromic layer 974, is laminated in the same way as the first layer 981, second layer 982, third layer 983 and fourth layer 984. A polycarbonate upper insulating protection layer 975 is formed on the side of the laser light incidence direction 962, and on the opposite side, a reflecting layer 977 and lower insulating protection layer 976 are formed.

In this multilayer optical memory, in the layer (first layer) wherein recording and reproducing were to be performed, a voltage was applied so that the potential of the second electrode relative to the first electrode was −5V and the second electrode was completely colored, and recording was performed by scanning with laser light of intensity 10 mW. During recording/reproducing, the in-layer interconnections and electrode arrangement were used as address information. Reproducing of the recording was achieved by similarly coloring the target layer (first layer), scanning with laser light of wavelength 660 nm and intensity 3 mW, and monitoring the reflected light intensity. Hence, recording/reproducing was performed successfully. Recording and reproducing were similarly performed in the second layer in the same way as in the first layer when the first layer had been completely decolored.

EXAMPLE 10

This example relates to an in-plane switching electrochromic device which improves the coloring efficiency and contrast.

The electrochromic device shown in FIG. 30 was manufactured by an identical method to that of Example 1, except that a polyaniline layer of thickness 30 nm was formed as the conductive layer 7. The electrochromic action was verified using identical materials to the materials shown in Example 1. Coloration/decoloration was repeated 100,000 times, and the deterioration was a decrease of coloring contrast of 8%.

If, in addition to polyaniline, the same materials as those used for the electrochromic layer of Example 1 were used for the conductive layer, the device operated in the same way.

The in-plane switching electrochromic device of this example may be used as any of the electrochromic devices described in the earlier examples of the invention, i.e., the information display panel shown in FIG. 15, the information recording medium shown in FIG. 20 and the device shown in FIG. 27.

What is claimed is:

1. An electrochromic device, comprising:
an insulating substrate;
first and second electrodes installed on said substrate, each of said first and second electrodes being installed in an in-plane direction of said substrate at a given distance apart;
an electrochromic layer installed on said substrate without being in contact with said first electrode and being in contact with said second electrode;
an electrolyte layer installed on said substrate in contact with said first electrode; and
an insulating protective layer formed on the electrochromic layer and the electrolyte layer;
wherein a boundary between said electrochromic layer and said electrolyte layer lies on said substrate and between said first electrode and said second electrode; and
wherein said insulating protective layer is installed in contact with both of said electrochromic layer and said electrolyte layer.

2. The electrochromic device according to claim 1, wherein said boundary is situated on said second electrode.

3. The electrochromic device according to claim 1, wherein said electrolyte is a liquid, said device having an insulating member for forming a sealed space on said substrate and said electrolyte being sealed in said sealed space.

4. The electrochromic device according to claim 1, wherein said electrochromic layer is displayed as pixels.

5. The electrochromic device according to claim 1, wherein said second electrode is a circular plane electrode having a circular aperture at its center, and said first electrode is an annular electrode situated inside said circular aperture.

6. The electrochromic device according to claim 1, wherein plural groups of said first electrode and said second electrode are disposed on said substrate.

7. An electrochromic device comprising:
an insulating substrate;
first and second electrodes installed on said substrate, each of said first and second electrodes being installed in an in-plane direction of said substrate at a given distance apart;
a conductive layer installed on said first electrode;
an electrochromic layer installed on said substrate without being in contact with said first electrode and, being in contact with said second electrode; and
an electrolyte layer installed on said substrate in contact with said conductive layer and said electrochromic layer,
wherein a boundary between said electrochromic layer and said electrolyte layer lies on said substrate.

8. The electrochromic device according to claim 7, wherein said boundary is situated on said second electrode.

9. The electrochromic device according to claim 7, wherein said conductive layer comprises an electrochromic material.

10. The electrochromic device according to claim 7, wherein said electrochromic layer is displayed as pixels.

11. The electrochromic device according to claim 7, wherein said second electrode is a circular plane electrode having a circular aperture at its center, and said first electrode is an annular electrode situated inside said circular aperture.

12. The electrochromic device according to claim 7, wherein plural groups of said first electrode and said second electrode are disposed on said substrate.

* * * * *